United States Patent
Hei et al.

(10) Patent No.: US 6,806,240 B1
(45) Date of Patent: *Oct. 19, 2004

(54) CONVEYOR LUBRICANT, PASSIVATION OF A THERMOPLASTIC CONTAINER TO STRESS CRACKING, AND THERMOPLASTICS STRESS CRACK INHIBITOR

(75) Inventors: Kimberly L. P. Hei, Baldwin, WI (US); Minyu Li, Oakdale, MN (US); Keith Darrell Lokkesmoe, Savage, MN (US); Joy G. Herdt, Hastings, MN (US); Guang-Jong Jason Wei, Mandota Heights, MN (US); Michael E. Besse, Golden Valley, MN (US)

(73) Assignee: Ecolab Inc., St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/049,452

(22) PCT Filed: Aug. 14, 2000

(86) PCT No.: PCT/US00/22190

§ 371 (c)(1),
(2), (4) Date: Jun. 14, 2002

(87) PCT Pub. No.: WO01/12759

PCT Pub. Date: Feb. 22, 2001

(51) Int. Cl.[7] .................. C10M 173/00; B65G 45/02
(52) U.S. Cl. .................. 508/208; 508/110; 198/500; 427/424
(58) Field of Search .................. 508/110, 208

(56) References Cited

U.S. PATENT DOCUMENTS

| | | | |
|---|---|---|---|
| 3,514,314 A | 5/1970 | Nemeth et al. | 427/294 |
| 3,853,607 A | 12/1974 | Iyengar et al. | 428/378 |
| 4,065,590 A | 12/1977 | Salensky | 428/35 |
| 4,069,933 A | 1/1978 | Newing | 215/1 C |
| 4,105,716 A | 8/1978 | Sakai et al. | 260/884 |
| 4,149,624 A | 4/1979 | Douty et al. | 198/500 |
| 4,264,650 A | 4/1981 | Schulze et al. | 427/195 |
| 4,274,973 A | 6/1981 | Stanton et al. | |

(List continued on next page.)

FOREIGN PATENT DOCUMENTS

| | | |
|---|---|---|
| EP | 0 359 330 A2 | 3/1990 |
| WO | WO 98/51746 | 11/1998 |

OTHER PUBLICATIONS

US 5,863,871, 1/1999, Besse et al. (withdrawn)
"Fin Food Lube Al. High Penetration Teflon® Lubricating Agent Especially Suitable for Automatic Lubrication Systems for the Food Processing Industry", *INTERFLON*, 20 pgs. (Date unknown).

(List continued on next page.)

*Primary Examiner*—Ellen M. McAvoy
(74) *Attorney, Agent, or Firm*—Merchant & Gould P.C.

(57) ABSTRACT

Thermally formed thermoplastic articles can be protected from stress cracking in the presence of stress cracking promoting compounds by forming a shaped article comprising a thermoplastic and a liquid hydrocarbon oil composition. We have found that the liquid hydrocarbon oil composition prevents the stress cracking promoting materials from interacting with the polymeric structure of the stressed container to prevent or inhibit stress cracking in such materials. The methods and compositions of the invention are particularly useful in preventing stress cracking in polyethylene terephthalate beverage containers during bottling operations during which the bottle in contacted with aqueous and non-aqueous materials such as cleaners and lubricants that can interact with the polyester to cause stress cracking particularly in the container base. A process for lubricating a container, such as a beverage container, or a conveyor for containers, by applying to the container or conveyor, a thin continuous, substantially non-dripping layer of a liquid lubricant. The process provides many advantages compared to the use of a conventional dilute aqueous lubricant.

33 Claims, 4 Drawing Sheets

U.S. PATENT DOCUMENTS

| | | | |
|---|---|---|---|
| 4,289,671 A | | 9/1981 | Hernandez |
| 4,375,444 A | * | 3/1983 | Deeken .................... 264/136 |
| 4,478,889 A | | 10/1984 | Maruhashi et al. ......... 427/230 |
| 4,486,378 A | | 12/1984 | Hirata et al. ................ 264/512 |
| 4,515,836 A | | 5/1985 | Cobbs, Jr. et al. .......... 427/425 |
| 4,525,377 A | | 6/1985 | Nickel et al. ................. 427/12 |
| 4,534,995 A | | 8/1985 | Pocock et al. ................ 427/38 |
| 4,538,542 A | | 9/1985 | Kennon et al. ............ 118/302 |
| 4,543,909 A | | 10/1985 | Sharpless .................... 118/326 |
| 4,555,543 A | | 11/1985 | Effenberger et al. ....... 524/520 |
| 4,569,869 A | | 2/1986 | Kushida et al. ............... 428/35 |
| 4,573,429 A | | 3/1986 | Cobbs, Jr. et al. .......... 118/322 |
| 4,604,220 A | | 8/1986 | Stanton |
| 4,632,053 A | | 12/1986 | Villanueva et al. ........... 118/66 |
| 4,690,299 A | | 9/1987 | Cannon ...................... 220/402 |
| 4,699,809 A | | 10/1987 | Maruhashi et al. ......... 427/230 |
| 4,713,266 A | | 12/1987 | Hasegawa et al. ....... 427/412.5 |
| 4,714,580 A | | 12/1987 | Maruhashi et al. ......... 264/516 |
| 4,828,727 A | | 5/1989 | McAninch |
| 4,851,287 A | | 7/1989 | Hartsing, Jr. ............... 428/325 |
| 4,855,162 A | | 8/1989 | Wrasidlo et al. ............ 427/243 |
| 4,874,647 A | | 10/1989 | Yatsu et al. ................ 428/35.7 |
| 4,919,984 A | | 4/1990 | Maruhashi et al. ........ 428/36.4 |
| 4,929,375 A | | 5/1990 | Rossio et al. |
| 4,980,211 A | | 12/1990 | Kushida et al. ............ 428/36.7 |
| 5,001,935 A | | 3/1991 | Tekkanat et al. .............. 73/799 |
| 5,009,801 A | | 4/1991 | Wider et al. |
| 5,073,280 A | | 12/1991 | Rossio et al. |
| 5,115,047 A | | 5/1992 | Hashimoto et al. ......... 525/444 |
| 5,145,721 A | | 9/1992 | Kojima et al. .............. 427/379 |
| 5,160,646 A | | 11/1992 | Scheld |
| 5,174,914 A | | 12/1992 | Gutzmann |
| 5,182,035 A | | 1/1993 | Schmidt et al. |
| 5,238,718 A | | 8/1993 | Yano et al. ................ 428/35.7 |
| 5,244,589 A | | 9/1993 | Liu et al. |
| 5,317,061 A | | 5/1994 | Chu et al. .................... 525/200 |
| 5,334,322 A | | 8/1994 | Williams, Jr. |
| RE34,742 E | | 9/1994 | Maier et al. ................ 428/36.5 |
| 5,352,376 A | | 10/1994 | Gutzmann |
| 5,371,112 A | | 12/1994 | Sayre et al. .................... 521/48 |
| 5,391,308 A | | 2/1995 | Despo ......................... 508/164 |
| 5,509,965 A | | 4/1996 | Harry et al. ................ 118/423 |
| 5,559,087 A | | 9/1996 | Halsrud et al. |
| 5,565,127 A | | 10/1996 | Laufenberg et al. ........ 508/220 |
| 5,573,819 A | | 11/1996 | Nugent, Jr. et al. ........ 428/34.8 |
| 5,652,034 A | | 7/1997 | Seiner ....................... 428/36.6 |
| 5,658,619 A | | 8/1997 | Kirschner et al. ........... 427/512 |
| 5,663,131 A | | 9/1997 | Winicov et al. |
| 5,672,401 A | | 9/1997 | Anglin et al. |
| 5,681,628 A | | 10/1997 | Niederst et al. |
| 5,698,269 A | | 12/1997 | Carlblom et al. ........... 427/475 |
| 5,719,022 A | | 2/1998 | Seedorf et al. |
| 5,721,023 A | | 2/1998 | Ostapchenko .............. 428/35.2 |
| 5,723,418 A | | 3/1998 | Person Hei et al. |
| 5,728,770 A | | 3/1998 | Yamamoto et al. ......... 524/755 |
| 5,783,303 A | | 7/1998 | Tsuei .......................... 428/354 |
| 5,789,459 A | | 8/1998 | Inagaki et al. ................ 522/16 |
| 5,863,874 A | | 1/1999 | Person Hei et al. |
| 5,876,812 A | | 3/1999 | Frisk et al. ................. 428/35.7 |
| 6,207,622 B1 | * | 3/2001 | Li et al. ...................... 508/208 |
| 6,288,012 B1 | * | 9/2001 | Li et al. ...................... 508/113 |
| 6,427,826 B1 | * | 8/2002 | Li et al. ...................... 198/500 |
| 6,495,494 B1 | | 12/2002 | Li et al. ...................... 508/206 |
| 6,509,302 B2 | * | 1/2003 | Li et al. ...................... 508/208 |
| 6,576,298 B2 | * | 6/2003 | Bennett et al. ............. 427/424 |

OTHER PUBLICATIONS

"Krytox® Dry Film Lubricant", *DUPONT*, 6 pgs. (Nov. 1997).

"Lube Application to Conveyor Surface/Containers", *Ecolab*, 7 pgs. (Jun. 13, 2000).

"Maintenance Products with Telflon®", http://www.interflon.nl/engels.htm, *INTERFLON*, 10 pgs. (Printed Jun. 18, 1999).

"Other Super Lube Products . . . What is Super Lube®?" http://www.super-lube.com, *SYNCO CHEMICAL CORPORATION*, 5 pgs. (Printed May 5, 1999).

Gangal, S., "Polytetrafluoroethylene", *Encyclopedia of Chemical Technology*, 4th Ed., vol. 11, pp. 621–644 (Date unknown).

Kondoh, M., "An Aerosol Lubricant", *Japanese Patent Application No. 57–3892*, 9 pgs. (Filed Jun. 10, 1980; Published Jan. 9, 1982).

Moskala, E., "Environmental Stress Cracking PET Beverage Containers", *BEV–PAK AMERICAS '96*, 14 pgs. (Apr. 15–16, 1996).

Moskala, E., "Environmental Stress Cracking in PET Carbonated Soft Drink Containers", *Bev Tech 98*, 22 pgs. (Mar. 30–Apr. 1, 1998).

Tekkanat, B. et al., "Environmental Stress Cracking Resistance of Blow Molded Poly(Ethylene Terephthalate) Containers", *Polymer Engineering and Science*, vol. 32, No. 6, pp. 393–397 (Mar. 1992).

Copy of European Search Report dated Jul. 17, 2003.

* cited by examiner

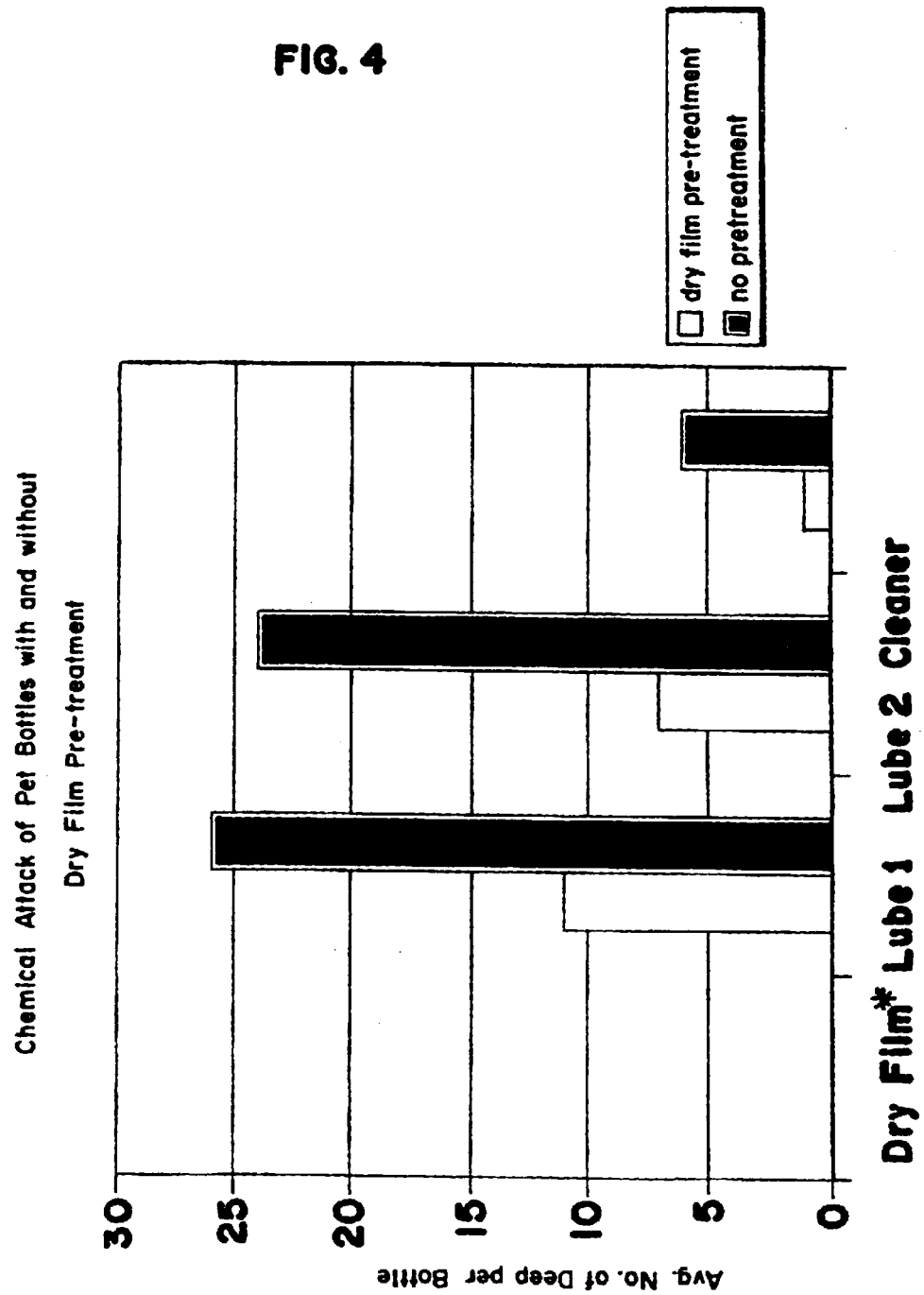

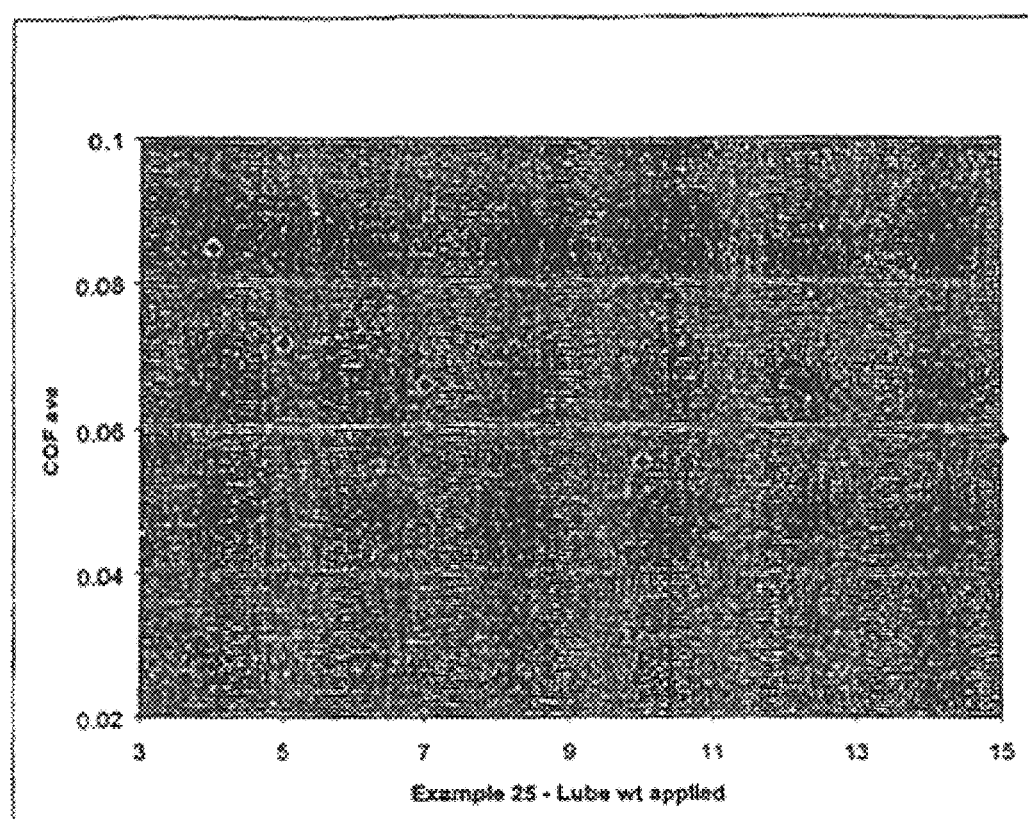

CONVEYOR LUBRICANT, PASSIVATION OF A THERMOPLASTIC CONTAINER TO STRESS CRACKING, AND THERMOPLASTICS STRESS CRACK INHIBITOR

FIELD OF THE INVENTION

The invention relates to conveyor lubricants and lubricant compositions, to methods of use, for example, to treat or lubricate a container(s) and conveyor surfaces or system for containers. The invention also relates to containers and conveyor surface or system treated with a lubricant or lubricant composition. The container is, for example, a food or beverage container.

The invention relates to maintaining the physical and structural integrity of shaped thermoplastic articles by inhibiting stress cracking. Many thermoplastic articles are formed using thermal methods at elevated temperatures. When formed into simple, regular or complex shapes and cooled, significant stress can remain in the thermoplastic material. The stress is undesirably relieved in the form of cracking. Such stress cracking can be substantially promoted if the stressed thermoplastic is contacted with a material that tends to promote stress cracking. The lubricating methods and compositions of the invention are intended to passivate, inhibit or prevent the undesirable interaction between the stressed thermoplastic and stress cracking promoters.

BACKGROUND OF THE INVENTION

In commercial container filling or packaging operations, the containers typically are moved by a conveying system at very high rates of speed. In current bottling operations, copious amounts of aqueous dilute lubricant solutions (usually based on ethoxylated amines or fatty acid amine) are typically applied to the conveyor or containers using spray or pumping equipment. These lubricant solutions permit high-speed operation (up to 1000 containers per minute or more) of the conveyor and limit marring of the containers or labels, but also have some disadvantages. For example, aqueous conveyor lubricants based on fatty amines typically contain ingredients that can react with spilled carbonated beverages or other food or liquid components to form solid deposits. Formation of such deposits on a conveyor can change the lubricity of the conveyor and require shutdown to permit cleanup. Some aqueous conveyor lubricants are incompatible with thermoplastic beverage containers made of polyethylene terephthalate (PET) and other plastics, and can cause stress cracking (crazing and cracking that occurs when the plastic polymer is under tension) in carbonated beverage filled plastic containers. Dilute aqueous lubricants typically require use of large amounts of water on the conveying line, which must then be disposed of or recycled, and which causes an unduly wet environment near the conveyor line. Moreover, some aqueous lubricants can promote the growth of microbes.

Thermoplastic materials have been used for many years for the formation of thermoplastic materials in the form of film, sheet, thermoformed and blow molded container materials. Such materials include polyethylene, polypropylene, polyvinylchloride, polycarbonate, polystyrene, nylon, acrylic, polyester polyethylene terephthalate, polyethylene naphthalate or co-polymers of these materials or alloys or blends thereof and other thermoplastic materials. Such materials have been developed for inexpensive packaging purposes. Thermoplastic materials are manufactured and formulated such that they can be used in thermoforming processes. Such thermal processing is used to form film, sheet, shapes or decorative or mechanical structures comprising the thermoplastic material. In such processes, the thermoplastic is heated to above the glass transition temperature ($T_g$) or above the melting point ($T_m$) and shaped into a desirable profile by a shaping die. After the shape is achieved, the material is cooled to retain the shape. The cooling of such materials after shaping can often lock-in stresses from the thermal processing Filling such a container with carbonated beverage can place large amounts of stress in the bottle structure. Most thermoplastic materials when stressed react undesirably to the stress and often relieve the stress through cracking. Such cracking often starts at a flaw in the thermoplastic and creeps through the thermoplastic until the stress is relieved to some degree.

Such stress cracking can be promoted by stress cracking promoter materials. Thermoplastics that are highly susceptible to stress cracking include polyethylene terephthalate, polystyrene, polycarbonate and other thermoplastics well known to the skilled materials scientist. The mechanism of stress crack promotion, initiation and propagation has been discussed and investigated but not clearly delineates Stress cracking can be explained by discussing interactions between stress cracking promoters and the polymeric chains that make up the thermoplastic material. The stress cracking promoters are believed to cause one or more chain to move relative to another chain, often initiated at a flaw in the plastic, resulting in cracking. Other theories include a consideration of the chemical decomposition of the thermoplastic material or (e.g.) a base catalyzed hydrolysis of the polyester bond resulting in weakened areas in the thermoplastic resulting in associated cracking. Lastly, the thermoplastic materials are believed to absorb more hydrophobic materials that soften the thermoplastic and, by reducing the strength of the thermoplastic, can promote the growth and propagation of stress cracking.

Regardless of the theory of the creation and propagation of stress cracks, thermoplastics manufacturers are well aware of stress cracking and have sought to develop thermoplastic materials that are more resistant to stress cracking. Stress cracking can be reduced by sulfonating the bulk thermoplastic after formation into a final article. Further, the manufacture of containers in two, three, four or other multilayer laminate structures is also believed to be helpful in reducing stress cracking. However, we have found that even the improved polymer materials can be susceptible to stress cracking, Further, certain commonly used container structures including polystyrene materials, polycarbonate materials, polyethylene terephthalate materials tend to be extremely sensitive to stress cracking promoters particularly when pressurized or used at high altitudes and can during manufacture, use or storage quickly acquire a degree of stress cracking that is highly undesirable.

One technology involving significant and expensive stress cracking involves the manufacture of polyethylene terephthalate (PET) beverage containers. Such beverage containers are commonly made in the form of a 20 oz, one, two or three liter container for carbonated beverages. Alternatively, a petaloid design can be formed into the polyester to establish a stable base portion for the bottle. In both formats, the polyester beverage container can have significant stress formed in the shaped bottom portion of the bottle. The stresses in the pentaloid structure tend to be greater because of the larger amorphous region and more complex profile of the container base.

Polyester beverage containers are made in a two step process. Melt thermoplastic is formed into a preform. Such preforms are relatively small (compared to the finished bottle) comprising the threaded closure portion and a "test tube" like shape that is blow molded into a final bottle conformation. In manufacturing the beverage containers, the preform is inserted into a blow molding apparatus that heats the preform and, under pressure, inflates the softened preform forcing the preform into a mold resulting in the final shape. The finished beverage containers are shipped to a filling location. The containers are filled with carbonated beverage in a filling apparatus that involves a moving conveyor surface that transports the container during filling. The conveyor structure comprises a filling station, a capping station ant ends at a packing station. While on the conveyor, the containers are exposed to an environment that contains residual cleaners and conveyor lubricants containing organic and inorganic stress cracking components that can interact with the polyester thermoplastic of the container. Stress cracking can appear as fine cracking that typically forms axially around the center of the bottle. The appearance of any stress cracking is undesirable. Should beverage containers stress crack, the pressure of the carbonated beverage can often cause the beverage container to explode and spill the beverage contents in the processing plant, transportation unit, warehouse or retail outlet. Such spillage poses health problems, sanitation problems, maintenance problems and is highly undesirable to manufacturers and retail merchants.

Initially such conveyor systems were lubricated using dilute aqueous lubricant materials. Typical early conveyor lubricants comprise substantially soluble sodium salt of the fatty acid or sodium salt of linear alkane sulfonate which acted to both lubricate and at least to some degree, clean the conveyor surfaces. Representative examples of such lubricants are found in Stanton et al., U.S. Pat. No. 4,274,973 and Stanton, U.S. Pat. No. 4,604,220. When conventional aqueous conveyor lubricant compositions were applied to conveyors for polyester beverage containers, the lubricants were found to be significant stress crack promoting materials. No clear understanding of the nature of stress crack promotion is known, however, the lubricant compositions containing basic materials (caustic and amine compounds) appear to be stress crack promoters. Such materials include aqueous soluble sodium salts, aqueous soluble amine compounds, and other weak to strong aqueous soluble bases have been identified as stress crack promoters. Other stress cracking promoters include solvents, phenols, strong acids, alcohols, low molecular weight alcohol ethoxylates, glycols and other similar materials.

A series of allegedly stress crack inhibiting substantially soluble aqueous lubricants were introduced including Rossio et al., U.S. Pat. Nos. 4,929,375 and 5,073,280; and Wieder et al., U.S. Pat. No. 5,009,801. These patents assert that certain substituted aromatic compounds, certain couplers and saponifying agents and certain amine compounds can inhibit stress cracking in appropriately formulated materials. Other patents, including Person Hei et al., U.S. Pat. Nos. 5,863,874 and 5,723,418; Besse et al., U.S. Pat. No. 5,863,871; Gutzmann et al., U.S. Pat. Nos. 5,559,087 and 5,352,376; Liu et al., U.S. Pat. No. 5,244,589; Schmitt et al., U.S. Pat. No. 5,182,035; Gutann et al., U.S. Pat. No. 5,174,914; teach conveyor lubricants that provide adequate lubrication, cleaning and inhibit stress cracking.

In many applications, known improved stress cracking resistant thermoplastic materials cannot be used for reasons of cost or poor processability properties. A substantial need exists for improved methods of preventing stress cracking in shaped thermoplastic materials in any environment. Important harsh environments include a stress crack promoter.

Containers are receptacles in which materials are or will be held or carried. Containers are commonly used in the food or beverage industry to hold food or beverages. Often lubricants are used in conveying systems for containers, to ensure the appropriate movement of containers on the conveyor.

In the commercial distribution of many products, including most beverages, the products are packaged in containers of varying sizes. The containers can be made of paper, metal or plastic, in the form of cartons, cans, bottles, Tetra Pak™ packages, waxed carton packs, and other forms of containers. In most packaging operations, the containers are moved along conveying systems, usually in an upright position, with the opening of the container facing vertically up or down. The containers arm moved from station to station, where various operations, such as filling, capping, labeling, sealing, and the like, are performed. Containers, in addition to their many possible formats and constructions, may comprise many different types of materials, such as metals, glasses, ceramics, papers, treated papers, waxed papers, composites, layered structures, and polymeric materials.

Lubricating solutions are often used on conveying systems during the filling of containers with, for example, beverages. There are a number of different requirements that are desirable for such lubricants. For example, the lubricant should provide an acceptable level of lubricity for the system. It is also desirable that the lubricant have a viscosity which allows it to be applied by conventional pumping and/or application apparatus, such as by spraying, roll coating, wet bed coating, and the like, commonly used in the industry.

In the beverage industry, the lubricant must be compatible with the beverage so that it does not form solid deposits when it accidentally contacts spilled beverages on the conveyor system. This is important since the formation of deposits on the conveyor system may change the lubricity of the system and could require shutdown of the equipment to facilitate cleaning.

The lubricant must be such that it can be cleaned easily. The container and/or the conveyor system may need to be cleaned. Since water is often in the cleaning solution, ideally the lubricant has some water-soluble properties.

Currently, containers, including polyethylene terephthalate (PET) bottles, and conveying systems for containers are often contacted with a volume of a dilute aqueous lubricant to provide lubricity to the container so that it can more easily travel down the conveyor system. Many currently used aqueous-based lubricants are disadvantageous because they are incompatible with many beverage containers, such as PET and other polyalkylene terephthalate containers, and may promote stress cracking of the PET bottles.

Furthernore, aqueous based lubricants are in general often disadvantageous because of the large amounts of water used, the need to use a wet work environment, the increased microbial growth associated with such water-based systems, and their high coefficient of friction. Moreover, most aqueous-based lubricants are incompatible with beverages.

Flooding a conveyor surface with a substantial proportion of aqueous lubricant typically occurs on food container filling or beverage bottling lines. Sufficient lubricant is used such that the lubricant is not retained entirely by the surface of the conveyor but tends to flow from the surface of the container, drip onto a conveyor support members and the surrounding environmental area around the conveyor. Further, sufficient amounts of lubricant are applied to the conveyor and other mechanisms of the plant under such conditions that a substantial foam layer of lubricant can form on the surface of the conveyor. As much as one inch (about 2.5 cm or more) thick of lubricant foam can contact a substantial portion of the base of a food container such as polyethylene terephthalate beverage bottle. We have found that current methods of lubricating such containers are wasteful of the lubricant material since a substantial proportion of the materials is lost as it leaves the container surface. Further, substantial proportions of the lubricant remain on the container and are carried from the conveyor as the food packaging or beverage-bottling operations are continued. A substantial need exists for approved methods that waste little or no lubricant during packaging or bottling operations.

The tendency of polyester (PET) beverage containers to crack or craze is promoted by the presence of a number of common lubricating materials in contact with a substantial proportion of the surface of a polyester beverage container under pressure. The stress arises during manufacture of the polyester bottle from a preform. The stress is locked into the beverage container during manufacture and is often relieved as the lubricant materials contact the bottle. Lubricant materials appear to promote movement of the polyester molecules with respect to each other, relieving stress and leading to the creation of stress cracking. We have found that the degree of stress cracking is attributable, at least in part, to the amount of surface area of the bottle contacted by the lubricant. We have found in our experimentation that limiting the amount of surface area of the bottle that comes in contact with the lubricant can substantially improve the degree of stress cracking that occurs in the bottle material. Clearly, a substantial need exists to develop lubricating methods that result in the minimum amount of lubricant contact with the surface of the food container.

BRIEF DESCRIPTION OF THE INVENTION

We have surprisingly found a number of techniques that can passivate containers to stress cracking and we have found unique formulations of lubricant materials that can be used on conveyor lines to lubricate the high speed filling of such bottles without substantial stress cracking.

One aspect of the invention involves a method of use of a liquid hydrocarbon lubricant. A next aspect includes forming a liquid lubricant for a polyethylene terephthalate beverage container. The lubricant comprises, in a liquid medium, a liquid hydrocarbon oil composition and optionally a lubricant additive composition. A further aspect of the invention involves contacting a conveyor with a liquid dispersion of a liquid hydrocarbon oil while simultaneously contacting the conveyor with a second lubricant composition. Lastly, an aspect of the invention comprises a method of operation a conveyor by forming a lubricant film on the conveyor, the film comprising a liquid medium and a liquid hydrocarbon oil composition. The lubricant film can be made from a single composition comprising all needed components or from a two (or more) package lubricant in which the liquid hydrocarbon oil material is separately packaged as a stress cracking inhibitor. In such a system the lubricant components can be packaged separately form the liquid hydrocarbon oil package.

We have surprisingly found that a liquid hydrocarbon oil composition can also passivate a shaped thermoplastic to stress cracking. We found a number of substantially hydrophobic materials such as oils, solid lubricant materials, silicone materials, and other materials that are not typically dispersed or suspended in aqueous solutions that can adequately passivate beverage containers, lubricate conveyor lines operating at high speeds and can operate successfully without promoting significant stress cracking in the container. Preferred materials that can be used in such an environment include oils including hydrocarbon oils, fatty oils, silicone oils, and other oily or hydrocarbon lubricants from a variety of sources. One particularly useful form of the lubricant is the form of a silicone material that can be used in common lubricant compositions. Further, one particularly advantageous form of such lubricants is in the form of an aqueous suspension of the lubricant that is in a formulation that can readily change phase from a suspended or dispersed lubricant material in the aqueous phase to a separate lubricating phase of the lubricant material not dispersed or suspended in the aqueous medium. The liquid hydrocarbon oil can be used in a thermoplastic shaped articles for the purpose of preventing stress cracking even when exposed to stress cracking promoting materials. For the purpose of the application, liquid hydrocarbon oil means a solvent-free hydrocarbon oil. Such solvents include aqueous materials and light, relatively volatile (compared to the oil) organic liquids. We believe that the oil can protect the bottles from chemical attack by a stress crack promoter at any time during and after manufacture. The oil can protect the bottles inside and out. Carbonated beverages, and particularly club soda, are known stress crack promoters that at virtually any time after manufacture can cause stress cracking when in contact with the outside of a beverage bottle due to high alkalinity and high stress. Other materials can stress crack such as manufacturing and packaging materials, materials used in filling operations, materials contained in the thermoplastic and materials contacting the thermoplastic after filling during storage and use. Contaminants found in the container coolers and warmers (biocides, alcoholic fermentation by-products, and build-up of alkalinity due to evaporation) can be significant stress crackers. Preferably such an oil is also substantially free of particulate lubricant materials such as $MoS_2$, alkali metal and alkaline earth metal salts, etc.

The thermoplastic material can be combined with liquid hydrocarbon oil in a variety of processes and structures. The thermoplastic material can be shaped with liquid hydrocarbon oil in the shaping die as a release agent. When formed into a shaped article, the liquid hydrocarbon oil, present on the surface of the thermoplastic can inhibit stress cracking. A second aspect in the invention includes contacting the shaped article with a liquid hydrocarbon oil material to form a thin coating of the liquid hydrocarbon oil on the surface of the container. A variety of techniques can be used including spraying, wiping, dipping, fogging, etc. with a liquid hydrocarbon oil containing composition to result in a thin coating on the surface of the container. The thin coating can act as a barrier to crack promoters preventing s crack formation Another aspect of the invention involves forming a coating on the shaped article with liquid hydrocarbon oil just before or just after the time of use. The typical use involves charging the container with typically liquid contents. Such contents can be liquid, gaseous or solid. A further aspect of the invention involves forming a coating of the liquid hydrocarbon oil on the thermoplastic article just prior to contact with a stress crack promoter.

One preferred mode of action involves methods of forming such a coating on a polyethylene terephthalate beverage container just prior to beverage filling operations. Lastly, an aspect of the invention involves forming a coating on the shaped thermoplastic article just after contact with a stress cracking promoter to reduce the undesirable impact of the promoter on the thermoplastic material.

We have found that the problems inherent in conventional aqueous lubrication of conveyor systems used in food packaging and beverage bottling can be substantially improved using a continuous thin film lubricant layer formed on a conveyor surface. The lubricant layer is maintained at a thickness of less than about 3 millimeters, preferably about 0.0001 to 2 mm, with an add on of lubricant on the surface of less than about 0.05 gms-in$^{-2}$, preferably about 5×10$^{-4}$ to 0.02 gms-in$^{-2}$, most preferably about 2×10$^{-4}$ to 0.01 gms-in$^{-2}$. Such a thin lubricating film of the lubricant on the conveyor provides adequate lubrication to the conveyor system but ensures that the lubricant cannot foam, does not flow from the conveyor surface and contacts the absolute minimum surface area of the food container such as the beverage bottle as possible. Such a thin film lubricant maintains significant lubrication while avoiding waste of the lubricant composition and avoiding stress cracking promotion. We have found that one mode of formation of the liquid lubricant compositions of the invention are in the form of an aqueous oil emulsion wherein the aqueous phase comprises about 10 to 50 wt % of the lubricant. The form of the emulsion can be either water in oil or oil in water emulsion. One preferred format of the emulsion is a phase unstable emulsion such that the emulsion separates forming an oil layer on top of a water layer which is then, in turn, contact with the conveyor surface. The methods of the invention can be used to convey virtually any food container on a conveyor line, but is particularly adapted to transporting both steel and aluminum cans and thermoplastic beverage containers such as polyethylene terephthalate beverage containers. Common PET beverage containers are formed with a pentaloid base having a five lobed structure in the base to provide stability to the bottle when it is placed on a surface. The contact with the lubricant on the pentaloid base must be minimized. We have found that using a thin film of emulsion lubricant, that less than about 10 to 300 mm$^2$, preferably 20 to 200 mm$^2$ of the surface of the bottle is contacted with lubricant. Certainly, the height of the lubricant in contact with the bottle is less than 3 millimeters. The motion of the conveyor, the tendency of the bottles to rock or move while being conveyed and the other aspects of relative movement at the bottle conveyor interface affect the height of the lubricant on the bottle. The methods of this invention are primarily directed to conveyor operations and do not involve any change in shape of the container arising from forming operations. The desirable coefficient of friction of the conveyor lubricant is about 0.1 to about 0.14.

Another aspect of the invention provides a method for lubricating the passage of a container along a conveyor comprising applying a mixture of a water-miscible silicone material and a water-miscible lubricant to at least a portion of the container-contacting surface of the conveyor or to at least a portion of the conveyor-contacting surface of the container. The present invention provides, in another aspect, a lubricated conveyor or container, having a lubricant coating on a container-contacting surface of the conveyor or on a conveyor-contacting surface of the container, wherein the coating comprises a mixture of a water-miscible silicone material and a water-miscible lubricant. The invention also provides conveyor lubricant compositions comprising a mixture of a water-miscible silicone material and a water-miscible lubricant. During some packaging operations such as beverage container filling, the containers are sprayed with warm water in order to warm the filled containers and discourage condensation on the containers downstream from the filling station. This warm water spray can dilute the conveyor lubricant and reduce its lubricity.

Still another aspect of the invention provides a method for lubricating the passage of a container along a conveyor comprising applying a phase-separating mixture of a hydrophilic lubricating material and an oleophilic lubricating material whose specific gravity is less than or equal to the specific gravity of the hydrophilic lubricating material, to at least a portion of the container-contacting surface of the conveyor or to at least a portion of the conveyor-contacting surface of the container. Prior to application to a conveyor or container, the mixture is agitated or otherwise maintained in a mixed but unstable state. Following application, the hydrophilic lubricating material and oleophilic lubricating material tend to undergo phase-separation, and we believe that the oleophilic lubricating material may tend to form a continuous or discontinuous film atop the hydrophilic lubricating material thereby providing a water-repelling lubricating layer having reduced water sensitivity.

The invention provides, in another aspect, a lubricated conveyor or container, having a lubricant coating on a container-contacting surface of the conveyor or on a conveyor-contacting surface of the container, wherein the coating comprises phase-separated layers of oleophilic lubricating material and a hydrophilic lubricating material. The invention also provides lubricating compositions for use on containers and conveyors, comprising an unstable mixture of an oleophilic lubricating material and a hydrophilic lubricating material. Therefore, it was an object of the present invention to provide an alternative to aqueous-based lubricants currently used in the container industry, which overcomes one or more of the disadvantages of currently used aqueous-based lubricants.

It was also an object of the invention to provide methods of lubricating containers, such as beverage containers, that overcome one or more of the disadvantages of current methods.

There is also provided a process comprising moving beverage containers on a conveyor that has been lubricated with a substantially non-aqueous lubricant or lubricant composition.

There is also provided in accordance with the invention, a conveyor used to transport containers, which is coated on the portions that contact the container with a substantially non-aqueous lubricant or lubricant composition.

There is also provided a composition for preventing or inhibiting the growth of microorganisms on a container or a conveyor surface for a container, comprising a substantially non-aqueous lubricant and an antimicrobial agent.

There is also provided a substantially non-aqueous lubricant and a substantially non-aqueous lubricant composition, and process for cleaning the lubricant or lubricant composition from the container and conveyor system.

Further objects, features, and advantages of the invention will become apparent from the detailed description that follows.

The compositions used in the invention can be applied in relatively low amounts and do not require in-line dilution with significant amounts of water. The compositions of the invention provide thin, substantially non-dripping lubricating films. In contrast to dilute aqueous lubricants, the lubricants of the invention provide drier lubrication of the conveyors and containers, a cleaner and drier conveyor line and working area, and reduced lubricant usage, thereby reducing waste, cleanup and disposal problems.

The present invention provides in one aspect a container or conveyor for containers whose surface is coated at least in part with a thin, substantially non-dripping layer of a water-based cleaning agent-removable lubricant.

The invention also provides a process for lubricating a container, comprising applying to at least a part of the surface of the container a thin, substantially non-dripping layer of a water-based cleaning agent-removable lubricant.

The invention also provides a process for lubricating a conveyor system used to transport containers, comprising applying a thin, substantially non-dripping layer of a water-based cleaning agent-removable, substantially non-aqueous lubricant to a conveying surface of a conveyor, and then moving containers, such as beverage containers, on the conveyor.

The compositions used in the invention can be applied in relatively low amounts and with relatively low or no water content, to provide thin, substantially non-dripping lubricating films. In contrast to dilute aqueous lubricants, the lubricants of the invention provide drier lubrication of the conveyors and containers, a cleaner conveyor line and reduced lubricant usage, thereby reducing waste, cleanup and disposal problems.

Further features and advantages of the invention will become apparent from the detailed description that follows.

BRIEF DESCRIPTION OF THE DRAWING

FIG. 4 is a graphical representation of the data in the case showing substantial reduction in stress cracking during lubrication.

FIG. 5 is a graphical representation of the friction data arising from the testing done with the Lubricant of Example 25.

DETAILED DESCRIPTION OF THE PREFERRED EMBODIMENTS

Figure 2:
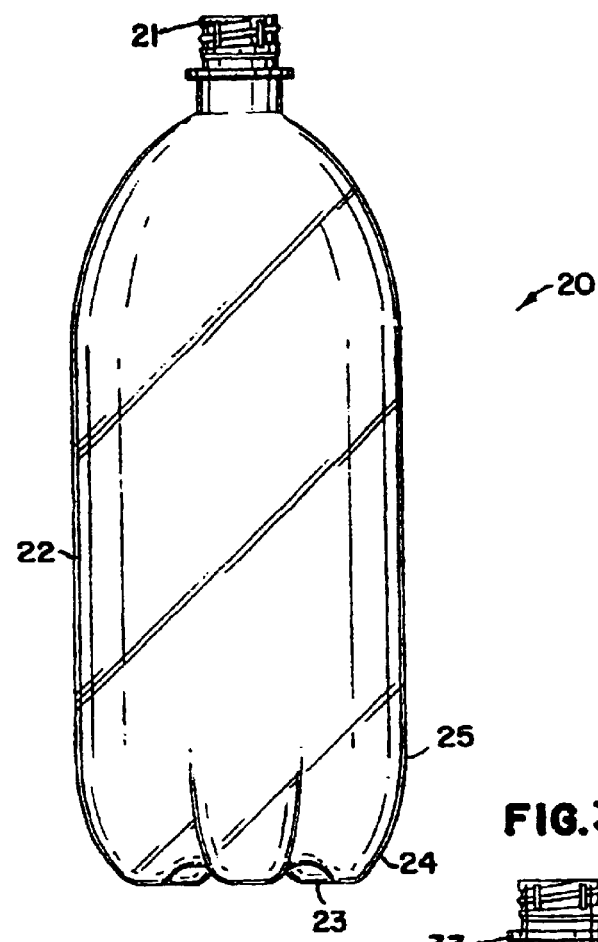
FIG. 2 is a side view of a typical two liter beverage container having a regular bottom shape that can be inserted into a polyethylene base cup.

The present invention uses a thin, substantially non-dripping layer of a water-based cleaning agent-removable, lubricant to lubricate containers and conveyor systems upon which the containers travel. By "substantially non-dripping", we mean that the majority of the lubricant remains on the container or conveyor following application until such time as the lubricant may be deliberately washed away. By "water-based cleaning agent-removable", we mean that the lubricant is sufficiently soluble or dispersible in water so that it can be removed from the container or conveyor using conventional aqueous cleaners, without the need for high pressure or mechanical abrasion. The phrase "substantially non-aqueous" means the lubricant component is non-aqueous, includes water only as an impurity, or includes an amount of active water that does not render the lubricant substantially non dripping. In one aspect, when water is present in the lubricant, the amount of water preferably is less than about 50%, more preferably less than about 40% and most preferably about 5 to about 50 % by weight based on the weight of the lubricant. The lubricant can be used neat, in the absence of any water diluent. Further, the lubricant can be formed by a phase change wherein a hydrophobic material dispersed or suspended in an aqueous solution changes a phase into a continuous lubricant phase containing little or no water. Lastly, in one aspect of the invention, a water miscible silicone material can be used in which the silicone is dispersed or suspended in an aqueous solution for useful lubricating properties.

The invention provides a lubricant coating that reduces the coefficient of friction of coated conveyor parts and containers and thereby facilitates movement of containers along a conveyor line. The lubricant compositions used in the invention can optionally contain water or a suitable diluent, as a component or components in the lubricant composition as sold or added just prior to use. The lubricant composition does not require in-line dilution with significant amounts of water, that is, it can be applied undiluted or with relatively modest dilution, e.g., at a water lubricant ratio of about 1:1 to 5:1. In contrast, conventional dilute aqueous lubricants are applied using dilution ratios of about 100:1 to 500:1. The lubricant compositions preferably provide a renewable coating that can be reapplied, if desired, to offset the effects of coating wear. They preferably can be applied while the conveyor is at rest or while it is moving, e.g., at the conveyor's normal operating speed. The lubricant coating preferably is substantially non-dripping, that is, preferably the majority of the lubricant remains on the container or conveyor following application until such time as the lubricant may be deliberately washed away.

The lubricant composition resists loss of lubricating properties in the presence of water or hydrophilic fluids, but can readily be removed from the container or conveyor using conventional aqueous cleaners, without the need for high pressure, mechanical abrasion or the use of aggressive cleaning chemicals. The lubricant composition can provide improved compatibility with plastic conveyor parts and plastic bottles, because the composition does not require inclusion of emulsifiers or other surfactants that can promote stress cracking in plastics such as PET.

A variety of materials can be employed to prepare the lubricated containers and conveyors of the invention, and to carry out the processes of the invention. For example, the lubricant can contain various natural lubricants, petroleum lubricants, synthetic oils and greases. Examples of natural lubricants include vegetable oils, fatty oils, animal fats, and others that are obtained from seeds, plants, fruits, and animal tissue. Examples of petroleum lubricants include mineral oils with various viscosities, petroleum distillates, and petroleum products. Examples of synthetic oils include synthetic hydrocarbons, organic esters, poly(alkylene glycol)s, high molecular weight alcohols, carboxylic acids, phosphate esters, perfluoroalkylpolyethers (PFPE), silicates, silicones such as silicone surfactants, chlorotrifluoroethylene, polyphenyl ethers, polyethylene glycols, oxypolyethylene glycols, copolymers of ethylene and propylene oxide, and the like. Examples of useful solid lubricants include molybdenum disulfide, boron nitride, graphite, silica particles, silicone guns and particles, polytetrafluoroethylene (PTFE, Teflon), fluoroethylene-propylene copolymers (FEP), perfluoroalkoxy resins (PFA), ethylene-chlorotrifluoroethylene alternating copolymers (ECTFE), poly (vinylidene fluoride) (PVDF), and the like. The lubricant composition can contain an effective amount of a water-based cleaning agent-removable solid lubricant based on the weight of the lubricant composition. The lubricant composition can also contain a solid lubricant as a suspension in a substantially non-aqueous liquid. In such a situation, the amount of solid lubricant can be about 0.1 to 50 weight percent, preferably 0.5 to 20 percent by weight, based on the weight of the composition. Also, the solid lubricant can be used without a liquid. In such a situation, the amount of solid lubricant can be from about 50 to about 100 weight percent, preferably from about 80 to about 98 percent by weight, based on the weight of the composition.

Specific examples of useful lubricants include oleic acid, corn oil, mineral oils available from Vulcan Oil and Chemical Products sold under the "Bacchus" trademark; fluorinated oils and fluorinated greases, available under the trademark "Krytox" from is DuPont Chemicals. Also useful are siloxane fluids available from General Electric silicones, such as SF96-5 and SF 1147 and synthetic oils and their mixture with PTFE available under the trademark "Super Lube" from Synco Chemical. Also, high performance PTFE lubricant products from Shamrock, such as nanoFLON M020™, FluoroSLIPT™ 225 and Neptune™ 5031 and polyalkylene glycols from Union Carbide such as UCON™ LB625, and Carbowax™ materials are useful.

A variety of water-miscible silicone materials can be employed in the lubricant compositions, including silicone emulsions (such as emulsions formed from methyl (dimethyl), higher alkyl and aryl silicones; functionalized silicones such as chlorosilanes; amino-, methoxy-, epoxy- and vinyl-substituted siloxanes; and silanols). Suitable silicone emulsions include E2175 high viscosity polydimethylsiloxane (a 60% siloxane emulsion commercially available from Lambent Technologies, Inc.), E21456 FG food grade intermediate viscosity polydimethylsiloxane (a 35% siloxane emulsion commercially available from Lambent Technologies, Inc.), HV490 high molecular weight hydroxy-terminated dimethyl silicone (an anionic 30–60% siloxane emulsion commercially available from Dow Coming Corporation), SM2135 polydimethylsiloxane (a nonionic 50% siloxane emulsion commercially available from GE Silicones) and SM2167 polydimethylsiloxane (a cationic 50% siloxane emulsion commercially available from GE Silicones. Other water-miscible silicone materials include finely divided silicone powders such as the TOSPEARL™ series (commercially available from Toshiba Silicone Co. Ltd.); and silicone surfactants such as SWP30 anionic silicone surfactant, WAXWS-P nonionic silicone surfactant, QUATQ-400M cationic silicone surfactant and 703 specialty silicone surfactant (all commercially available from Lambent Technologies, Inc.). Preferred silicone emulsions typically contain from about 30 wt. % to about 70 wt. % water. Non-water-miscible silicone materials (e.g., non-water-soluble silicone fluids and non-water-dispersible silicone powders) can also be employed in the lubricant if combined with a suitable emulsifier (e.g., nonionic, anionic or cationic emulsifiers). For applications involving plastic containers (e.g., PET beverage bottles), care should be taken to avoid the use of emulsifiers or other surfactants that promote environmental stress cracking in plastic containers when evaluated using the PET Stress Crack Test set out below. Polydimethylsiloxane emulsions are preferred silicone materials. Preferably the lubricant composition is substantially free of surfactants aside from those that may be required to emulsify the silicone compound sufficiently to form the silicone emulsion.

Preferred amounts for the silicone material, hydrophilic lubricant and optional water or hydrophilic diluent are about 0.05 to about 12 wt. % of the silicone material (exclusive of any water or other hydrophilic diluent that may be present if the silicone material is, for example, a silicone emulsion), about 30 to about 99.95 wt. % of the hydrophilic lubricant, and 0 to about 69.95 wt. % of water or hydrophilic diluent. More preferably, the lubricant composition contains about 0.5 to about 8 wt. % of the silicone material, about 50 to about 90 wt. % of the hydrophilic lubricant, and about 2 to about 49.5 wt. % of water or hydrophilic diluent. Most preferably, the lubricant composition contains about 0.8 to about 4 wt. % of the silicone material, about 65 to about 85 wt % of the hydrophilic lubricant, and about 11 to about 34.2 wt. % of water or hydrophilic diluent.

The silicone lubricants can be water-soluble but are preferably water-dispersible in a cleaning mode. In such cases, the lubricant can be easily removed from the container, if desired, by, for example, treatment with water. The lubricant, whether water-soluble or dispersible or not, is preferably easily removable from the container, conveyor and/or other surfaces in the vicinity, with common or modified detergents, for example, including one or more of surfactants, an alkalinity source, and water-conditioning agents. Useful water-soluble or dispersible lubricants include, but are not limited to, polymers of one or more of ethylene oxide, propylene oxide, methoxy polyethylene glycol, or an oxyethylene alcohol. Preferably the lubricant is compatible with the beverage intended to be filled into the container.

If water is employed in the lubricant compositions, preferably it is deionized water. Other suitable hydrophilic diluents include alcohols such as isopropyl alcohol. For applications involving plastic containers, care should be taken to avoid the use of water or hydrophilic diluents containing contaminants that might promote environmental stress cracking in plastic containers when evaluated using the PET Stress Crack Test set out below.

While many substantially non-aqueous lubricants are known per se, they have not been previously known or suggested to be used in the container or beverage container industries as described in this application. In certain embodiments, it is preferred that the lubricant is other than a (i) organic polymer, or other than a (ii) fluorine-containing polymer, or other than (iii) PTFE. In these embodiments, if (i), (ii) or (iii) is desired to be used, it can be used in combination with another lubricant The substantially non-aqueous lubricant used in the present invention can be a single component or a blend of materials from the same or different type of class of lubricant. Any desired ratio of the lubricants can be used so long as the desired lubricity is achieved. The lubricants can be in the form of a fluid, solid, or mixture of two or more miscible or non-miscible components such as solid particles dispersed in a liquid phase.

Also, a multistep process of lubricating can be used. For example, a first stage of treating the container and/or conveyor with a substantially non-aqueous lubricant and a second stage of treating with another lubricant, such as a substantially non-aqueous lubricant or an aqueous lubricant can be used. Any desired aqueous lubricant can be used, such as water. Any desired substantially non-aqueous lubricant can be used in the first or second stage. The lubricant of the second stage can be solid or liquid. By selection of appropriate first and second stages, desired lubrication can be provided. Also, the order of the second stage and first stage can be switched to give desired lubrication.

In addition to the lubricant, other components can be included with the lubricant to provide desired properties. For example, antimicrobial agents, colorants, foam inhibitors or foam generators, PET stress cracking inhibitors, viscosity modifiers, friction modifiers, antiwear agents, oxidation inhibitors, rust inhibitors, extreme pressure agents, detergents, dispersants, foam inhibitors, film forming materials and/or surfactants can be used, each in amounts effective to provide the desired results.

Examples of useful antiwear agents and extreme pressure agents include zinc dialkyl dithiophosphates, tricresyl phosphate, and alkyl and aryl disulfides and polysulfides. The antiwear and/or extreme pressure agents are used in amounts to give desired results. This amount can be from 0 to about 20 weight percent, preferably about 1 to about 5 weight percent for the individual agents, based on the total weight of the composition.

Examples of useful detergents and dispersants include alkybenzenesulfonic acid, alkylphenols, carboxylic acids, alkylphosphonic acids and their calcium, sodium and magnesium salts, polybutenylsuccinic acid derivatives, silicone surfactants, fluorosurfactants, and molecules containing polar groups attached to an oil-solubilizing aliphatic hydrocarbon chain. The detergent and/or dispersants are used in an amount to give desired results. This amount can range from 0 to about 30, preferably about 0.5 to about 20 percent by weight for the individual component, based on the total weight of the composition Useful antimicrobial agents include disinfectants, antiseptics and preservatives. Non-limiting examples of useful antimicrobial agents include phenols including halo- and nitrophenols and substituted bisphenols such as 4-hexylresorcinol, 2-benzyl-4-chlorophenol and 2,4,4'-trichloro-2'-hydroxybiphenyl ether, organic and inorganic acids and its esters and salts such as dehydroacetic acid, peroxycarboxylic acids, peroxyacetic acid, methyl p-hydroxy benzoic acid, cationic agents such as quaternary ammonium compound, aldehydes such as glutaraldehyde, antimicrobial dyes such as is acridines, triphenylmethane dyes and quinones and halogens including iodine and chlorine compounds. The antimicrobial agents can be used in an amount sufficient to provide desired antimicrobial properties. For example, from 0 to about 20 weight percent, preferably about 0.5 to about 10 weight percent of antimicrobial agent, based an the total weight of the composition can be used.

Examples of useful foam inhibitors include methyl silicone polymers. Non-limiting examples of useful foam generators include surfactants such as non-ionic, anionic, cationic and amphoteric compounds. These components can be used in amounts to give the desired results.

Viscosity modifiers include pour-point depressants and viscosity improvers such as polymethacrylates, polyisobutylenes and polyalkyl styrenes. The viscosity modifier is used in amount to give desired results, for example, from 0 to about 30 weight percent, preferably about 0.5 to about 15 weight percent, based on the total weight of the composition.

A layer of solid lubricant can be formed as desired, for example, by curing or solvent casting. Also, the layer can be formed as a film or coating or fine powder on the container and/or conveyor, without the need for any curing containers, including polyethylene terephthalate containers, polymer laminates, and metal containers, such as aluminum cans, papers, treated papers, coated papers, polymer laminates, ceramics, and composites can be treated.

By container is meant any receptacle in which material is or will be held or carried. For example, beverage or food containers are commonly used containers. Beverages include any liquid suitable for drinking, for example, fruit juices, soft drinks, water, milk, wine, artificially sweetened drinks, sports drinks, and the like. The lubricant should generally be non-toxic and biologically acceptable, especially when used with food or beverage containers.

The present invention is advantageous as compared to prior aqueous lubricants because the substantially non-aqueous lubricants have good compatibility with PET, superior lubricity, low cost because large amounts of water are not used, and allow for the use of a dry working environment. Moreover, the present invention reduces the amount of microbial contamination in the working environment, because microbes generally grow much faster in aqueous environments, such as those from commonly used aqueous lubricants.

The lubricant can be applied to a conveyor system surface that comes into contact with containers, the container surface that needs lubricity, or both. The surface of the conveyor that supports the containers may comprise fabric, metal, plastic, elastomer, composites, or mixture of these materials. Any type of conveyor system used in the container field can be treated according to the present invention.

Spraying, wiping, rolling, brushing, atomizing or a combination of any of these methods can be used to apply the liquid lubricant to the conveyor surface and/or the container surface. If the container surface is coated, it is only necessary to coat the surfaces that come into contact with the conveyor, and/or that come into contact with other containers.

Similarly, only portions of the conveyor that contacts the containers need to be treated. The lubricant can be a permanent coating that remains on the containers throughout its useful life, or a semi-permanent coating that is not present on the final container.

Hydrocarbon oils can be effective in lubricating thermoplastic shaped article operations and in particular, passivating polyester beverage containers. In particular, the invention can be used in lubricating PET thermoplastic article filing operations with little or no harmful stress cracking Petroleum products dominate such liquid oil compositions, however, various synthetic oils can also be used because of the temperature stability, chemical inertness, low toxicity and environmental compatibility of synthetic materials. Natural and synthetic petroleum oils typically range from low viscosity oils having a molecular weight of about 250 to relatively viscous lubricants having a molecular weight of 1000 and more. Typical oils are a complex mixture of hydrocarbon molecules that can include branched and linear alkanes, aliphatic compounds, cyclic compounds, aromatic compounds, substituted aromatic compounds, polycyclic compounds, etc. Physical properties and performance characteristics of the materials depend heavily on a relative distribution of paraffinic, aromatic, alicyclic (naphthenic) components. For a given molecular size, paraffinic materials have lower viscosities, lower density and a higher freezing temperature. Aromatics have higher viscosity, a more rapid change in viscosity as temperature changes, higher density and a darker color. Preferred oils are typically paraffinic oils comprising primarily paraffinic and alicyclic structure. These materials can be substantially improved by exhaustively treating the material to remove aromatic and saturated character from the oil. Such treatments can include sulfonation and extraction or exhaustive perhydrogenation of the liquid hydrocarbon oil.

Synthetic oils can also find use in the applications of the invention. Such synthetic oils include polyalphaolefins, $C_{6-24}$ diesters of $C_{6-24}$ diacids, polyalkylene glycols, polyisobutylenes, polyphenylene ethers and others. Common diester lubricants include preferably a $C_{6-10}$ branch chain alcohol esterified with a $C_{6-10}$ diacid. Examples of such useful materials include di-2-ethylhexyl sebacate, didodecyl azeleite, didecyl adipate, and others.

A highly refined fatty oil can also be used in the applications of the invention. Such oils can include both animal and vegetable derived oils. Such oils are typically fatty acid triglycerides formed from highly unsaturated fatty acids or relatively low molecular weight triglycerides formed from fatty acids having 4 to 12 carbon atoms. Preferred hydrocarbon oils of the invention comprise refined vegetable oils combined with antioxidant, antimicrobial and other stabilizing additive materials.

One very important property of liquid hydrocarbon oils is viscosity. Viscosity of an oil is related to the stiffness or internal friction of the materials as each lubricant oil molecule moves past another. The preferred parameter for measuring viscosity is kinematics viscosity in $mm^2$-$sec^{-1}$ (also known as centistokes, cSt). The preferred viscosity of the hydrocarbon oils of this application is typically less than 50 $mm^2$-$sec^{-1}$, preferably less than 30 $mm^2$-$sec^{-1}$, most preferably less than 20 $mm^2$-$sec^{-1}$ at 40° C. and less than 15 $mm^2$-$sec^{-1}$, preferably less than 10 $mm^2$-$sec^{-1}$, most preferably less than 5 $mm^2$-$sec^{-1}$ at 100° C. The viscosity of the materials above 100° C. is substantially irrelevant with respect to treating or lubricating thermoplastic materials. Most thermoplastics are used at temperatures that range from about 20° C. to about 40° C. The lubricating oil materials of the invention can include chemical additives. Such additives can include oxygenation inhibitors, rust inhibitors, antiwear agents, friction modifiers, detergents and dispersants, antimicrobials, foam inhibitors and other well known additives. The liquid hydrocarbon oil material used in the invention can comprise a single component lubricant oil which can be a natural, synthetic or petroleum oil material used without any substantial formulation. Further, the liquid hydrocarbon oils of the invention can comprise a blend of two or more petroleum oils, two or more synthetic oils, or two or more fatty or natural oils. Further, the liquid hydrocarbon oils of the invention can comprise a blend of two or more of the natural, synthetic or petroleum oil material. Such blended oil materials can have advantages of low viscosity, improved inertness and moisture resistance. Further, the liquid hydrocarbon oil can be formulated by combining an oil or oil blend with a variety of other lubricating materials. The formulations can include the chemical additives recited above or can also contain lubricating materials such as silicone oils, fatty amines, peroxyalkylated fatty amines, hydrocarbon phosphonates, oil soluble quaternary ammonium compounds, oil soluble linear or alkyl sulfonates, or other oil soluble lubricating ingredients. Preferably, the resulting liquid hydrocarbon oil material is manufactured from materials generally recognized as safe or known to be compatible with food, particularly beverage applications.

A variety of hydrophilic lubricating materials can be employed in the oil based lubricant compositions, or otherwise as disclosed herein, including hydroxy-containing compounds such as polyols (e.g., glycerol and propylene glycol); polyalkylene glycols (e.g., the CARBOWAX™ series of polyethylene and methoxypolyethylene glycols, commercially available from Union Carbide Corp.); linear copolymers of ethylene and propylene oxides (e.g., UCON™ 50-HB-100 water-soluble ethylene oxidepropylene oxide copolymer, commercially available from Union Carbide Corp.); and sorbitan esters (e.g., TWEEN™ series 20, 40, 60, 80 and 85 polyoxyethylene sorbitan monooleates and SPAN™ series 20, 80, 83 and 85 sorbitan esters, commercially available from ICI Surfactants). Other suitable hydrophilic lubricating materials include phosphate esters, amine and their derivatives, and other commercially available hydrophilic lubricating materials that will be familiar to those skilled in the art. Derivatives (e.g., partial esters or ethoxylates) of the above hydrophilic lubricating materials can also be employed For applications involving plastic containers, care should be taken to avoid the use of hydrophilic lubricating materials that might promote environmental stress cracking in plastic containers when evaluated using the PET Stress Crack Test set out below. Preferably the hydrophilic lubricating material is a polyol such as glycerol, whose specific gravity is 125 for a 96 wt. % solution of glycerol in water.

A variety of oleophilic lubricating materials can be employed in the invention. Because the oleophilic lubricating material has a specific gravity that is less than or equal to the specific gravity of the hydrophilic lubricating material, the choice of oleophilic lubricating material will be influenced in part by the choice of hydrophilic lubricating material. Preferably the oleophilic lubricating material is substantially "water-immiscible", that is, the material preferably is sufficiently water-insoluble so that when added to water at the desired use level, the oleophilic lubricating material and water form separate phases. The desired use level will vary according to the particular conveyor or container application, and according to the type of oleophilic lubricating material and hydrophilic lubricating material employed. Preferred oleophilic lubricating materials include silicone fluids, fluorochemical fluids and hydrocarbons. Suitable silicone fluids include methyl alkyl silicones such as SF1147 and SF8843 silicone fluids with respective specific gravities of 0.89 and 0.95–1.10, both commercially from GE Silicones. Preferred hydrocarbons include vegetable oils (e.g., corn oil) and mineral oils (e.g., mineral seal oil with a specific gravity of 0.816, commercially available from Calument Lubricant Co.; BACCHUS™ 22 mineral oil, commercially available from Vulcan Oil and Chemical Products; and ARIADNE™ 22 mineral oil having a specific gravity of 0.853–0.9, also commercially available from Vulcan Oil and Chemical Products). For applications involving plastic containers, care should be taken to avoid the use of oleophilic lubricating materials that might promote environmental stress clacking in plastic containers when evaluated using the PET Stress Crack Test set out below. Preferably the oleophilic lubricating material comprises a mineral oil or mineral seal oil.

Preferred amounts for the hydrophilic lubricating material, oleophilic lubricating material and optional water or other diluent are about 30 to about 99.9 wt. % of the hydrophilic lubricating material, about 0.1 to about 30 wt. % of the oleophilic lubricating material and 0 to about 69.9 wt. % of water or other diluent. More preferably, the lubricant composition contains about 50 to about 90 wt. % of the hydrophilic lubricating material, about 1 to about 15 wt. % of the oleophilic lubricating material, and about 2 to about 49 wt. % of water or other diluent. Most preferably, the lubricant composition contains about 65 to about 85 wt. % of the hydrophilic lubricating material, about 2 to about 10 wt. % of the oleophilic lubricating material, and about 8 to about 33 wt. % of water or other diluent.

Formation of an unstable mixture and promotion of early phase separation will be aided by avoiding the use of emulsifiers or other surfactants that often are employed in conveyor lubricants. Because many emulsifiers promote environmental stress cracking in blow-molded polyethylene terephthalate bottles, the invention thus permits a desirable reduction in or elimination of ingredients that might otherwise cause PET stress cracking. Preferably the lubricant composition is substantially free of surfactants.

The lubricant compositions can contain additional components if desired. For example, the compositions can contain adjuvants such as conventional waterborne conveyor lubricants (e.g., fatty acid lubricants), antimicrobial agents, colorants, foam inhibitors or foam generators, cracking inhibitors (e.g., PET stress cracking inhibitors), viscosity modifiers, film forming materials, antioxidants or antistatic agents. The amounts and types of such additional components will be apparent to those skilled in the art.

For applications involving plastic containers, the lubricant compositions preferably have a total alkalinity equivalent to less than about 100 ppm $CaCO_3$, more preferably less than about 50 ppm $CaCO_3$, and most preferably less than about 30 ppm $CaCO_3$, as measured in accordance with Standard Methods for the Examination of Water and Wastewater, 18th Edition, Section 2320, Alkalinity.

The lubricant compositions preferably have a coefficient of friction (COF) that is less than about 0.14, more preferably less than about 0.1, when evaluated using the Short Track Conveyor Test described below.

A variety of kinds of conveyors and conveyor parts can be coated with the lubricant composition. Parts of the conveyor that support or guide or move the containers and thus are preferably coated with the lubricant composition include belts, chains, gates, chutes, sensors, and ramps having surfaces made of fabrics, metals, plastics, composites, or combinations of these materials.

The lubricant composition can be a liquid or semi-solid at the time of application. Preferably the lubricant composition is a liquid having a viscosity that will permit it to be pumped and readily applied to a conveyor or containers, and that will facilitate rapid film formation and phase separation whether or not the conveyor is in motion. The lubricant composition can be formulated so that it exhibits shear thinning or other pseudo-plastic behavior, manifested by a higher viscosity (e.g., non-dripping behavior) when at rest, and a much lower viscosity when subjected to shear stresses such as those provided by pumping, spraying or brushing the lubricant composition. This behavior can be brought about by, for example, including appropriate types and amounts of thixotropic fillers (e.g., treated or untreated fumed silicas) or other rheology modifiers in the lubricant composition. The lubricant coating can be applied in a constant or intermittent fashion. Preferably, the lubricant coating is applied in an intermittent fashion in order to minimize the amount of applied lubricant composition. For example, the lubricant composition can be applied for a period of time during which at least one complete revolution of the conveyor takes place. Application of the lubricant composition can then be halted for a period of time (e.g., minutes or hours) and then resumed for a further period of time (e.g., one or more farther conveyor revolutions). The lubricant coating should be sufficiently thick to provide the desired degree of lubrication, and sufficiently thin to permit economical operation and to discourage drip formation. The lubricant coating thickness preferably is maintained at at least about 0.0001 mm, more preferably about 0.001 to about 2 mm, and most preferably about 0.005 to about 0.5

Prior to application to the conveyor or container, the lubricant composition should be mixed sufficiently so that the lubricant composition is not substantially phase-separated. Mixing can be carried out using a variety of devices. For example, the lubricant composition or its individual components can be added or metered into a mixing vessel equipped with a suitable surer. The stirred lubricant composition can then be pumped to the conveyor or containers (or to both conveyors and containers) using a suitable piping system. Preferably a relatively small bore piping system equipped with a suitable return line to the mixing vessel is employed in order to maintain the lubricating composition in an unstable, adequately mixed condition prior to application. Application of the lubricant composition can be carried out using any suitable technique including spraying, wiping, brushing, drip coating, roll coating, and other methods for application of a thin film. If desired, the lubricant composition can be applied using spray equipment designed for the application of conventional aqueous conveyor lubricants, modified as need be to suit the substantially lower application rates and preferred non-dripping coating characteristics of the lubricant compositions used in the invention For example, the spray nozzles of a conventional beverage container lube line can be replaced with smaller spray nozzles or with brushes, or the metering pump can be altered to reduce the metering rate. Preferably the lubricant composition is applied sufficiently upstream from any water spray or other source of water spillage on the conveyor line so that the lubricant composition will have time to undergo phase separation before it maybe exposed to water.

The present invention uses a substantially non-aqueous lubricant to lubricate containers and/or conveyor systems upon which the containers travel. Substantially non-aqueous means the lubricant is non-aqueous or includes water only as an impurity, or includes an amount of water that does not significantly and adversely affect the stability and lubricating properties of the composition, for example, less than 10%, or less than 5%, or less than 1% by weight of water based on the weight of the lubricant. Preferably the lubricant is compatible with the beverage intended to be filled into the container.

The containers of the invention can be made from virtually any thermoplastic that can have any degree of stress cracking in the plastic when filled with a beverage or under pressure from beverage contents. Such thermoplastic materials can include polyethylene, polypropylene, polycarbonate, polyvinylchloride, polystyrene and other such polymerized materials. The polymers of greatest interest include polyethylene terephthalate, polyethylene naphthalate, polycarbonate and other similar polymers. Copolymers of interest include copolymers and ethylene and dibasic acids such as terephthalic acid, naphthenic acid and others. Further, containers made of polymer alloys or blends such as blended PET and PEN, blended PVC and polyacrylates along with other alloys and blends can be useful. Further, containers comprising two or more laminated polymer layers can be useful. Any of the thermoplastic materials mentioned above can be used in each of the layers of the bottle. One useful material that can avoid stress cracking while maintaining high concentrations of carbonation in a carbonated beverage can include a PET/PVOH laminate, a PEN/PVOH laminate, a polycarbonate/PET laminate, a polystyrene/PET laminate and others. Further, additional layers can be introduced for the purpose of achieving additional properties in the container structure. For example, a layer can be added to the laminate that protects the beverage contained within the bottle from reaching residual monomer from the polyester, the PVC or other plastic. A laminate layer can be introduced to the exterior of the bottle for the formation of a printable surface. In such a way a useful bottle material can be made using a variety of materials in a variety of structures including single component bottles, polymer alloys and blends and laminates of various size and composition.

Containers include beverage containers; food containers; household or commercial cleaning product containers; and containers for oils, antifreeze or other industrial fluids. The containers can be made of a wide variety of materials including glasses; plastics (e.g., polyolefins such as polyethylene and polypropylene; polystyrenes; polyesters such as PET and polyethylene naphthalate (PEN); polyamides, polycarbonates; and mixtures or copolymers thereof); metals (eg., aluminum, tin or steel); papers (e.g., untreated, treated, waxed or other coated papers); ceramics; and laminates or composites of two or more of these materials (e.g., laminates of PET, PEN or mixtures thereof with another plastic material). The containers can have a variety of sizes and forms, including cartons (e.g., waxed cartons or TETRAPACK™ boxes), cans, bottles and the like. Although any desired portion of the container can be coated with the lubricant composition, the lubricant composition preferably is applied only to parts of the container that will come into contact with the conveyor or with other containers. Preferably, the lubricant composition is not applied to portions of thermoplastic containers that are prone to stress cracking. In a preferred embodiment of the invention, the lubricant composition is applied to the crystalline foot portion of a blow-molded, footed PET container (or to one or more portions of a conveyor that will contact such foot portion) without applying significant quantities of lubricant composition to the amorphous center base portion of the container. Also, the lubricant composition preferably is not applied to portions of a container that might later be gripped by a user holding the container, or, if so applied, is preferably removed from such portion prior to shipment and sale of the container. For some such applications the lubricant composition preferably is applied to the conveyor rather than to the container, in order to limit the extent to which the container might later become slippery in actual use.

These polymer materials can be used for making virtually any container that can be thermoformed, blow molded or shaped in conventional thermoplastic shaping operations. Included in the description of containers of the invention are containers for carbonated beverages such as colas, fruit flavored drinks, root beers, ginger ales, carbonated water, etc. Also included are containers for malt beverages such as beers, ales, porters, stouts, etc. Additionally, containers for dairy products such as whole, 2% or skim milk are included along with containers for juices, Koolaid® (and other reconstituted drinks), tea, Gatoraide® or other sport drinks, neutraceutical drinks and still (non-carbonated) water. Further, food containers for flowable but viscous or non-Newtonian foods such as catsup, mustard, mayonnaise, applesauce, yogurt, syrups, honey, etc. are within the scope of the invention. The containers of the invention can be virtually any size including (e.g.) five gallon water bottles, one gallon milk chugs or containers, two liter carbonated beverage containers, twenty ounce water bottles, pint or one half pint yogurt containers and others. Such beverage containers can be of various designs. Designs can be entirely utilitarian with a shape useful simply for filling transportation, sales and delivery. Alternatively, the beverage containers can be shaped arbitrarily with designs adapted for marketing of the beverage including the classic "coke" shape, any other decorative, trademarked, distinctive, or other design can be incorporated into the bottle exterior.

Initial experimental results appear to suggest that the lubricant of the invention such as the liquid oil lubricant materials, the silicone or otherwise tend to associate with the surface of the thermoplastic container and also associate with flaws in the surface of the plastic that can give rise to stress cracking or protect stress cracking surfaces from the undesirable effect of stress cracking promoters. The oil associated with the surface of the bottle tends to prevent stress cracking by isolating flaws and sensitive surfaces from the undesirable effect of stress crack promoters during operations using the lubricant oil.

The substantially non-aqueous lubricant used in the present invention can be a single component or a blend of materials from the same or different type of class of lubricant. Any desired ratio of the lubricants can be used so long as the desired lubricity is achieved. The lubricants can be in the form of a fluid, solid, or mixture of two or more miscible or non-miscible components such as solid particles dispersed in a liquid phase.

Also, a multistep process of lubricating can be used For example, a first stage of treating the container and/or conveyor with a substantially non-aqueous lubricant and a second stage of treating with another lubricant, such as a substantially non-aqueous lubricant or an aqueous lubricant can be used. Any desired aqueous lubricant can be used, such as water. Any desired substantially non-aqueous lubricant can be used in the first or second stage. The lubricant of the second stage can be solid or liquid. By selection of appropriate first and second stages, desired lubrication can be provided. Also, the order of the second stage and first stage can be switched to give desired lubrication.

In addition to the lubricant, other components can be included with the lubricant to provide desired properties. For example, antimicrobial agents, colorants, foam inhibitors or foam generators, PET stress cracking inhibitors, viscosity modifiers, friction modifiers, antiwear agents, oxidation inhibitors, rust inhibitors, extreme pressure agents, detergents, dispersants, foam inhibitors, film forming materials and/or surfactants can be used, each in amounts effective to provide the desired results.

Examples of useful antiwear agents and extreme pressure agents include zinc dialkyl dithiophosphates, tricresyl phosphate, and alkyl and aryl disulfides and polysulfides. The antiwear and/or extreme pressure agents are used in amounts to give desired results. This amount can be from 0 to about 20 weight percent, preferably about 1 to about 5 weight percent for the individual agents, based on the total weight of the composition.

Examples of useful detergents and dispersants include alkybenzenesulfonic acid, alkylphenols, carboxylic acids, alkylphosphonic acids and their calcium, sodium and magnesium salts, polybutenylsuccinic acid derivatives, silicone surfactants, fluorosurfactants, and molecules containing polar groups attached to an oil-solubilizing aliphatic hydrocarbon chain. The detergent and/or dispersants are used in an amount to give desired results. This amount can range from 0 to about 30, preferably about 0.5 to about 20 percent by weight for the individual component, based on the total weight of the composition.

Useful antimicrobial agents include disinfectants, antiseptics and preservatives. Non-limiting examples of useful antimicrobial agents include phenols including halo- and nitrophenols and substituted bisphenols such as 4-hexylresorcinol, 2-benzyl-4-chlorophenol and 2,4,4'-trichloro-2'-hydroxybiphenyl ether, organic and inorganic acids and its esters and salts such as dehydroacetic acid, peroxycarboxylic acids, peroxyacetic acid, methyl p-hydroxy benzoic acid, cationic agents such as quaternary ammonium compound, aldehydes such as glutaraldehyde, antimicrobial dyes such as acridines, triphenylmethane dyes and quinones and halogens including iodine and chlorine compounds. The antimicrobial agents is used in amount to provide desired antimicrobial properties. For example, from 0 to about 20 weight percent, preferably about 0.5 to about 10 weight percent of antimicrobial agent, based on the total weight of the composition can be used.

Examples of useful foam inhibitors include methyl silicone polymers. Non-limiting examples of useful foam generators include surfactants such as non-ionic, anionic, cationic and amphoteric compounds. These components can be used in amounts to give the desired results.

Viscosity modifiers include pour-point depressants and viscosity improvers such as polymethacrylates, polyisobutylenes and polyalkyl styrenes. The viscosity modifier is used in amount to give desired results, for example, from 0 to about 30 weight percent, preferably about 0.5 to about 15 weight percent, based on the total weight of the composition.

A layer of solid lubricant can be formed as desired, for example, by curing or solvent casting. Also, the layer can be formed as a film or coating or fine powder on the container and/or conveyor, without the need for any curing.

The lubricant can be used to treat any type of container, including those mentioned in the Background section of this application. For example, glass or plastic containers, including polyethylene terephthalate containers, polymer laminates, and metal containers, such as aluminum cans, papers, treated papers, coated papers, polymer laminates, ceramics, and composites can be treated.

By container is meant any receptacle in which material is or will be held or carried. For example, beverage or food containers are commonly used containers. Beverages include any liquid suitable for drinking, for example, fruit juices, soft drinks, water, milk, wine, artificially sweetened drinks, sports drinks, and the like.

The lubricant should generally be non-toxic and biologically acceptable, especially when used with food or beverage containers.

The present invention is advantageous as compared to prior aqueous lubricants because the substantially non-aqueous lubricants have good compatibility with PET, superior lubricity, low cost because large amounts of water are not used, and allow for the use of a dry working environment. Moreover, the present invention reduces the amount of microbial contamination in the working environment, because microbes generally grow much faster in aqueous environments, such as those from commonly used aqueous lubricants.

The lubricant can be applied to a conveyor system surface that comes into contact with containers, the container surface that needs lubricity, or both The surface of the conveyor that supports the containers may comprise fabric, metal, plastic, elastomer, composites, or mixture of these materials. Any type of conveyor system used in the container field can be treated according to the present invention.

The lubricant can be applied in any desired manner, for example, by spraying, wiping, rolling, brushing, or a combination of any of these, to the conveyor surface and/or the container surface. The lubricant can also be applied by vapor deposition of lubricant, or by atomizing or vaporizing the lubricant to form fine droplets that are allowed to settle on the container and/or conveyor surface.

If the container surface is coated, it is only necessary to coat the surfaces that come into contact with the conveyor, and/or that come into contact with other containers. Similarly, only portions of the conveyor that contacts the containers need to be treated. The lubricant can be a permanent coating that remains on the containers throughout its useful life, or a semi-permanent coating that is not present on the final container.

DETAILED DESCRIPTION OF THE DRAWINGS

Figure 1:
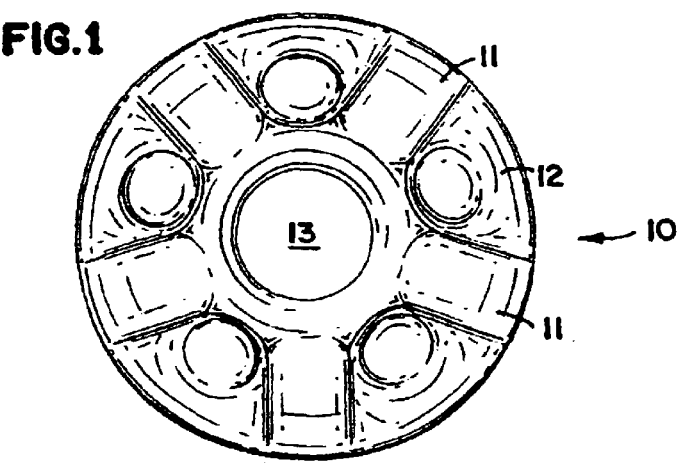
FIG. 1 is a bottom view of a two liter beverage container having a five lobe design thermoformed in the bottle to form a base upon which the bottle can stably rest.

FIG. 1 is a bottom view of the petaloid base portion 10 of a two liter beverage container made of poly(ethylene-co-terephthalate). The shape of the bottom is manufactured by thermoforming a preform of the polyester thermoplastic in a mold having the desired base shape. The heated thermoplastic is forced against the mold in a manner that forces the thermoplastic to conform to the appropriate shape. The five lobe base portion is made up of five identical lobes 12 formed around a center indentation 13. The lobes define recessed portions 11 between each lobe 12. The lobes are conformed to form a pentagram shaped pattern of resting surfaces. The resulting conformation formed in the base cup 10 provides a stable support surface that can maintain the container in an upright position.

FIG. 2 is a side view of a typical two liter beverage container formed for insertion into a polyethylene base cup (not shown). The container 20 comprises a threaded surface for a screw on cap closure device. The bottle 20 further contains a thermoformed device. The bottle 20 further contains a thermoformed wall 22 which extends from the threaded portion 21 to a base portion 24. During blow molding, the base portion 24 is formed in a mold that forces the hot thermoplastic to conform to the shape of the mold. The mold conforms the thermoplastic into a base portion beginning at a transition zone 25 into a curvilinearly shaped base portion. The shaped base portion includes a spherically shaped indentation 23 that cooperates with the other base components 24 and 25 to maintain the contents of the container (not shown) under pressure without pressure induced rupture. The shaped portion of the base typically contains the stress locked into the thermoplastic by cooling the material after blow molding.

Figure 3:
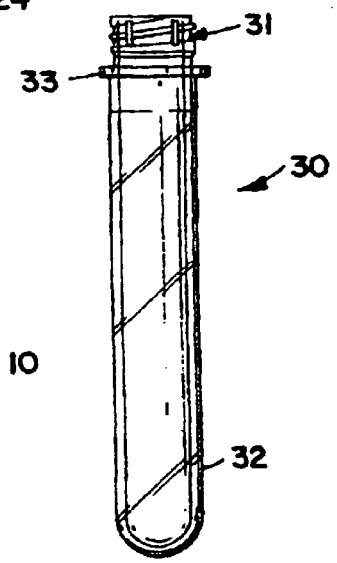
FIG. 3 is a side view of a typical PET preform prior to blow molding into a final bottle shape.

FIG. 3 shows a typical PET preform used in blow molding the beverage container of FIG. 2. Such preform 30 has a threaded end neck portion 31 adapted for a screw on top or lid. The preform typically has a collar 33. The preform has a "test tube" shape 32 with sufficient polyester thermoplastic typically in a substantially oriented polymeric format such that when blow molded, to a two liter size or other size at the discretion of the operator, has sufficient strength to maintain structural integrity after filling with a volume of carbonated beverage.

A liquid hydrocarbon oil can be used to associate with and form a coating on the bottle or portion of the bottle shown in FIGS. 1 and 2. The oil can also be used to associate with the surface or a portion of the surface of the preform of FIG. 3. The oil can be combined with the bottle in a variety of known techniques. Importantly, the oil is directly associated with all of or a portion of the thermoplastic material that can stress crack. Typically, the most serious stress cracking is found at areas of large amounts of amorphous materials, Such areas include the pentaloid shape of FIG. 1. Stress in the preform arises generally after formation into a container. These locations are typically sensitive to stress cracking because of the relatively larger amount of amorphous material (compared to the walls of the structures) and the nature of the forming process.

Figure 6:
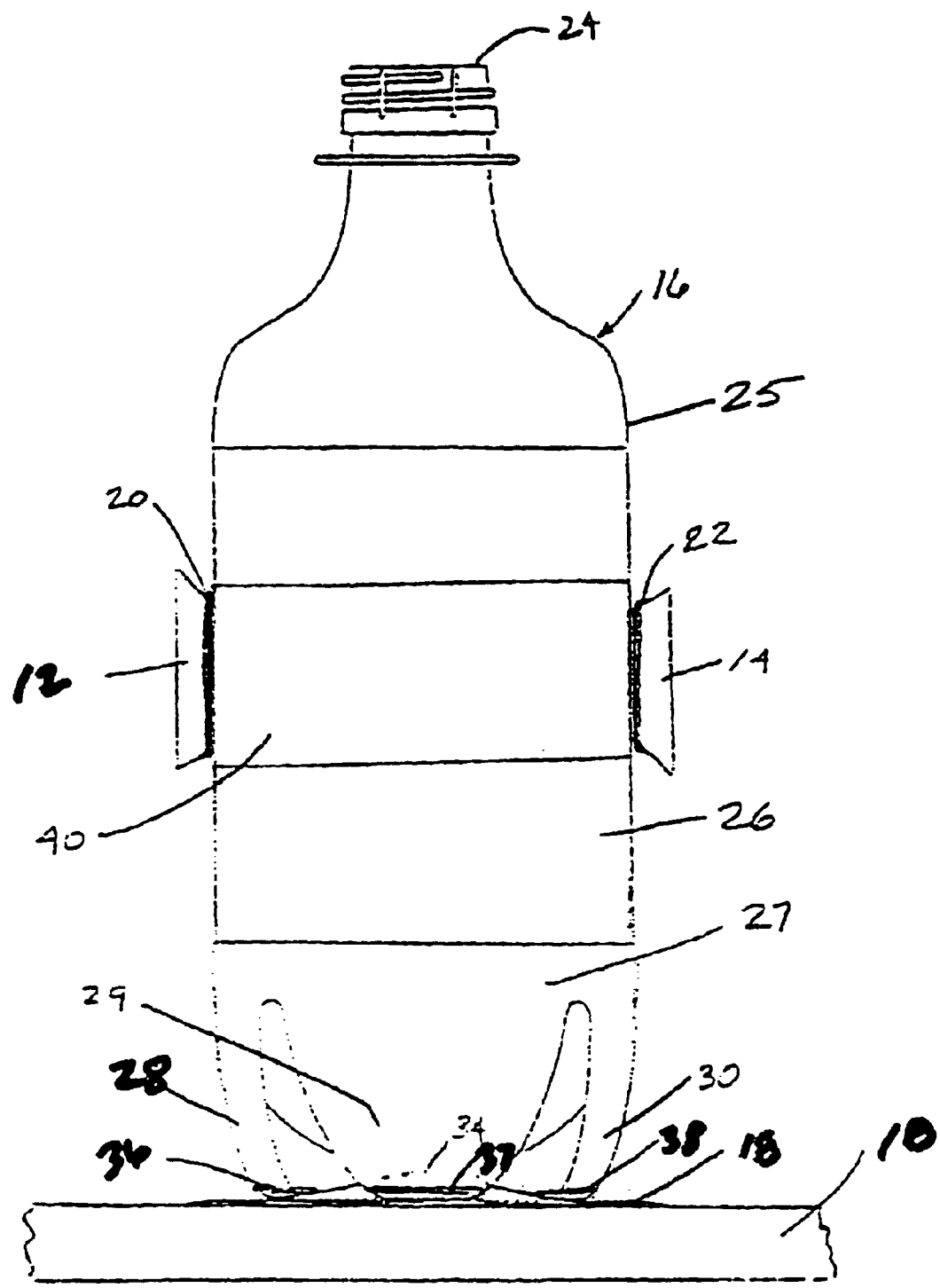
FIG. 6 illustrates in partial cross-section a side view of a plastic beverage container and conveyor partially coated with a lubricant composition of the invention.

The invention is further illustrated in FIG. 6, which shows a conveyor belt 10, conveyor chute guides 12, 14 and beverage container 16 in partial cross-sectional view. The container-contacting portions of belt 10 and chute guides 12, 14 are coated with thin layers 18, 20 and 22 of a lubricant composition of the invention. Container 16 is constructed of blow-molded PET, and has a threaded end 24, side 25, label 26 and base portion 27. Base portion 27 has feet 28, 29 and 30, and crown portion (shown partially in phantom) 34. Thin layers 36, 37 and 38 of a lubricant composition of the invention cover the conveyor-contacting portions of container 16 on feet 28, 29 and 30, but not crown portion 34. Thin layer 40 of a lubricant composition of the invention covers the conveyor-contacting portions of container 16 on label 26. The silicone material and hydrophilic lubricant are "water-miscible", that is, they are sufficiently water-soluble or water-dispersible so that when added to water at the desired use level they form a stable solution, emulsion or suspension. The desired use level will vary according to the particular conveyor or container application, and according to the type of silicone and hydrophilic lubricant employed.

EXPERIMENTAL

Example 1

A liquid hydrocarbon oil material is made by combining a paraffinic solvent, petroleum white oil, a stabilized-modified vegetable oil and a dispersed Teflon® particulate.

The following examples contain a stress crack promoter: a nonionic, an amine or an alkali metal base.

Comparative Example 1

A foamed PET lubricant is made by combining a lubricating amount of $(EO)_y(PO)_x$ block copolymer with an aqueous diluent and a sanitizing amount of hydrogen peroxide.

Comparative Example 2

An aqueous track lubricant is made by combining an effective lubricant amount of an ethoxylated amine an alkyl amine, corrosion inhibitor and a cationic biocide.

Comparative Example 3

An alkaline cleaner with chlorine is made by combining potassium hydroxide, an encapsulated chlorine source, sodium tripolyphosphate, a surfactant package and a water conditioner.

Laboratory Passivation Testing Results and Conclusions

The following is a table of results that is a model of the performance of a typical 2-liter polyester bottle having a surface passivated to stress cracking with a liquid hydrocarbon oil. The term "passivate" indicates that the surface passivated by a coating is less likely to stress crack. The bottle is contacted with the oil and the with model stress cracking promoters of the comparative examples. FIG. 4 is a graphical representation of these results. In the figure the first portion of the graph represent the lack of stress cracking of the bottle when exposed to a hydrocarbon oil such as that in Example 1. The next set of bar graphs show that the liquid oil reduces the cracking of the bottle in the presence of the foamed lubricant. The next bar graph shows that the oil reduces the stress cracking effects of the track lubricant Lastly the last set of bar graphs show that the oil reduces the stress cracking effects of a highly caustic chlorinated cleaner.

TABLE 1

Stress Cracking Testing

| Treatment | Bottle | Number of Crazes per bottle | Average Number of Crazes per Bottle |
|---|---|---|---|
| Example 1 | 1 | 0 | — |
| | 2 | 0 | — |
| | 3 | 0 | — |
| | 4 | 0 | 0 |
| Example 1 with Foamed PET lube | 1 | 6 | — |
| | 2 | 24 | — |
| | 3 | 3 | — |
| | 4 | 11 | 11 |
| Foamed PET lube and no oil | 1 | 20 | — |
| | 2 | 22 | — |
| | 3 | 32 | — |
| | 4 | 28 | 26 |
| Example 1 with Track Lube | 1 | 9 | — |
| | 2 | 7 | — |
| | 3 | 8 | — |
| | 4 | 3 | 7 |
| Track Lube and no oil | 1 | 4 | — |
| | 2 | 17 | — |
| | 3 | 26 | — |
| | 4 | 49 | 24 |
| Example 1 with Alkaline Cleaner with Chlorine | 1 | 2 | — |
| | 2 | 1 | — |
| | 3 | 0 | — |
| | 4 | 0 | 1 |
| Alkaline Cleaner with Chlorine and no oil | 1 | 2 | — |
| | 2 | 4 | — |
| | 3 | 8 | — |
| | 4* | 9 | 6 |

*This bottle leaked contents during testing due to depth of craze.

Conclusions:
   Example 1 exhibited minimal attack on the PET bottles.
   Example 1 applied to PET bottles prior to conveyor lubricant contact acted to reduce the chemical attack of the lubricant.
   Example 1 applied to PET bottles prior to contact with residual levels of an alkaline cleaner acted to reduce chemical attack of the cleaner.

Chemical Attack Test Method

Charging the PET Bottles
   Fill PET bottles with 1850 gm chilled city water
   Add 33 grams citric acid
   Add 33 grams sodium bicarbonate
   Immediately cap with closure
   Shake bottles to mix contents
   Rinse under DI water
   Place on paper toweling to equilibrate overnight
Preparing the Test Solutions
   Foamed PET Lubricant
   Combine one part Commercial Foamed Lubricant with 99 parts distilled water
   Stir to combine
   Transfer to bowl of electric mixer
   Whip to stiff foam (two minutes with whipping attachment)
   Conveyor track brewery lubricant
   Combine one part of lubricant with 99 parts distilled water
   Stir to combine
   Transfer to bowl of electric mixer
   Whip to stiff foam (two minutes with whipping attachment)
   Enforce Chlorinated Alkaline Foam Cleaner
   Combine one part Enforce with 399 parts distilled water
   Stir to combine
   Transfer to bowl of electric mixer
   Whip to stiff foam (two minutes with whipping attachment
Treating the Charged Bottles
   Dry Film Lube Control
   Apply one drop of the Fin Food Lube AL to the gate area of the bottle
   Smear the drop on the bottle base covering the amorphous region, base of feet, and strap areas Lubricant and Foam Cleaner Controls Dip the bottle base into the stiff foam so that the foam contacts the amorphous region, base of feet, and the strap areas Dry Film Lube followed by Lubricant or Foam Cleaner Apply the Fin Food Lube AL as above Dip the bottle into the lube or foam cleaner foam as above Bottle Handling and Storage Place each bottle into an elongated zip lock bag and seal the bag Place up to 12 bottles into lined plastic bins Place the plastic bins into a humidity chamber set to 90% RH and 100° F.

Store the bottles in the chambers for 16 days

Release bottle pressure, remove them from the chambers and empty the bottles

Cut bottle bases off of bottles

Bottle Observations and Grading

Smear red lipstick onto bottle base with gloved finger, working it into crazed areas as much as possible Spray 99% isopropyl alcohol onto microwipe to moisten Wipe excess lipstick from base with IPA coated wipe Observe and record the pattern of crazing and the number of crazes with residual lipstick

Example 2–4

These examples demonstrated that corn oil, a natural oil, possesses lubricities which are better than or comparable to a commercially available aqueous based lube.

The cylinder material was mild steel for Example 2, glass for Example 3, and PET for Example 4. The rotating disk was stainless steel for Example 2–4.

|  | EXAMPLE 2 Mild steel-on stainless steel lubricity | | EXAMPLE 3 Glass-on stainless steel lubricity | | EXAMPLE 4 PET-on stainless steel lubricity | |
| --- | --- | --- | --- | --- | --- | --- |
|  | Corn oil | Refer. 1 | Corn oil | Refer. 1 | Corn oil | Refer. 1 |
| Drag force (average) (g) | 21.0 | 35.1 | 25.3 | 26.1 | 25.7 | 36.0 |
| Rel COF | 0.598 | 1.000 | 0.969 | 1.000 | 0.714 | 1.000 |

The average drag force was recorded and the Rel COF was calculated based on the average drag forces of the testing sample and the reference as measured by the lubricity test detailed below.

Example 5–7

These examples demonstrated that Bacchus™ 22, a mineral oil, possesses lubricities which are better than the commercially available aqueous based lube. The cylinder material was mild steel for Example 5, glass for Example 6, and PET for Example 7. The rotating disk was stainless steel for Example 5–7.

|  | EXAMPLE 5 Mild steel-on stainless steel lubricity | | EXAMPLE 6 Glass-on stainless steel lubricity | | EXAMPLE 7 PET-on stainless steel lubricity | |
| --- | --- | --- | --- | --- | --- | --- |
|  | Bacchus 22 | Refer. 1 | Bacchus 22 | Refer. 1 | Bacchus 22 | Refer. 1 |
| Drag force (average) (g) | 10.2 | 31.3 | 22.4 | 27.6 | 18.6 | 31.1 |
| Rel COF | 0.326 | 1.000 | 0.812 | 1.000 | 0.598 | 1.000 |

Example 8–9

These examples demonstrated that the two synthetic lubricants have a mild steel-on-stainless steel lubricity that is better than or comparable to the commercially available aqueous based lube. The cylinder material was mild and the rotating disk was stainless steel.

|  | EXAMPLE 8 Krytox GPL 100 | EXAMPLE 9 Krytox GPL 200 | Reference 1 |
| --- | --- | --- | --- |
| Drag force (average) (g) | 15.1 | 34.3 | 35.0 |
| Rel COF | 0.431 | 0.980 | 1.000 |

Example 10

This example demonstrated that SF96-5, a synthetic siloxane lubricant, has a PET-on stainless steel lubricity that is better than the commercially available aqueous based lube. The cylinder material was PET and the rotating disk was stainless steel.

|  | SF96-5 | Reference 1 |
| --- | --- | --- |
| Drag force (average) (g) | 27.6 | 35.1 |
| Rel COF | 0.786 | 1.000 |

Example 11

This example demonstrated that Krytox™ DF5O, a solid lubricant in a solvent, possesses a mild steel-on stainless steel-lubricity that is comparable to the commercially available aqueous based lube. The cylinder material was mild steel and the rotating disk was stainless steel.

|  | Krytox DF50 | Reference 1 |
| --- | --- | --- |
| Drag force (average) (g) | 35.7 | 35.0 |
| Rel COF | 1.020 | 1.000 |

The sample was applied to the disc surface then the coating was wiped with an isopropanol-wetted towel and air dried to result in a very thin, smooth coating.

Example 12–13

These examples demonstrated that behenic acid, a dry solid lubricant possesses a mild steel-on-stainless steel and glass-on-stainless steel lubricities which are comparable to a second commercially available aqueous based lube.

|  | EXAMPLE 12<br>Mild steel-on<br>stainless lubricity | | EXAMPLE 13<br>Glass-on<br>stainless steel lubricity | |
| --- | --- | --- | --- | --- |
|  | Behenic acid | Reference 2 | Behenic acid | Reference 2 |
| Drag force (average) (g) | 30.0 | 28.0 | 28.0 | 28.0 |
| Rel COF | 1.071 | 1.000 | 1.000 | 1.000 |

A solution of 0.1% behenic acid in ethanol was applied to the stainless steel rotating disc. A thin dry film was formed after the solvent evaporation.

Example 14

This example demonstrated that the Super lube oil with PTFE possesses a mild steel-on-stainless steel lubricity that is better than the commercially available aqueous based lube. The rotating disk was stainless steel.

|  | Super lube oil with PTFE | Reference 1 |
| --- | --- | --- |
| Drag force (average) (g) | 27.9 | 33.2 |
| Rel COF | 0.840 | 1.000 |

Example 15–16

These examples demonstrated that the mixture of oleic acid and Krytox GPL100 possesses mild steel-on-stainless steel and PET-on-stainless steel lubricities, which are better than the commercially available aqueous based lube. The ratio of oleic acid to Krytox GPL100 is about 1:1 by weight. The rotating disk was stainless steel.

|  | EXAMPLE 15<br>Mild steel-on<br>stainless steel lubricity | | EXAMPLE 16<br>PET-on<br>stainless steel lubricity | |
| --- | --- | --- | --- | --- |
|  | Oleic acid/Krytox GPL100 (1:1) | Reference 1 | Oleic acid/Krytox GPL100 (1:1) | Reference 1 |
| Drag force (average) (g) | 17.1 | 33.7 | 21.4 | 35.7 |
| Rel COF | 0.507 | 1.000 | 0.599 | 1.000 |

Example 16–17

These examples demonstrate that the mineral oil, Bacchus 68 and its mixture with an antimicrobial agent, IRGASAN™ DP300 (2,4,4'-trichloro-2'-hydroxy-diphenyl-ether, obtained from Ciba Specialty Chemicals) possess a superior PET stress cracking resistance.

PET Bottle Stress Cracking Test:

31.0 g of sodium bicarbonate and 31.0 g of citric acid were added to a 2-liter PET bottle (manufactured by Plastipak) containing 1850 g of chilled water and the bottle was capped immediately. The charged bottle was then rinsed with DI water and set on clear paper towel overnight.

Two testing liquids were prepared. Bacchus 68 was used as such as supplied. Bacchus 68+0.2% Irgasan DP300 was made by dissolving 1.0 g of Irgasan DP300 in 500 g of Bacchus 68 to result in a clear solution.

The base of the charged bottle was dipped into the testing liquid for 2–3 seconds then the bottle was placed in a plastic bag. The bottle with the bag was set in a bin and aged at 37.8° C. and 90% humidity for 15 days. Four bottles were used for each testing liquid. The bottle was examined several times during the aging for bursting.

After the aging, the base of the bottle was cut off and examined for crazing and cracking. The results are listed in the table below.

The grading is based on a scale of A–F as:

A: No signs of crazing to infrequent small, shallow crazes.
B: Frequent small, shallow to infrequent medium depth crazes which can be felt with a fingernail.
C: Frequent medium depth to infrequent deep crazes.
D: Frequent deep crazes.
F: Cracks, bottle burst before end of the 15 day testing.

|  | PET STRESS CRACKING GRADING | |
| --- | --- | --- |
| Testing Liquid | EXAMPLE 17<br>Bacchus 68 | EXAMPLE 18<br>Bacchus 68 + 0.2%<br>Irgasan DP300 |
| Bottle 1 | B | B |
| Bottle 2 | B | B |
| Bottle 3 | B | B |
| Bottle 4 | B | B |

Example 19

This example demonstrates that the mineral oil, Bacchus 68 possesses a higher PET stress cracking resistance in contrast to the aqueous based beverage conveyor is lubricant, Lubodrive RX at a possible use dosage for conveyor lubrication.

The experimental procedure was the same as described in example 17–18 except that the testing liquid for Lubrodrive RX was 0.75% by weight in DI water. The charged bottle was placed in the plastic bag that contained 100 g of the diluted Lubodrive RX. Also the experimental was cared out in the environmental oven at 37.8° C. and 90% humidity for 13 days instead of 15 days.

The results showed that Bacchus 68 caused less stress cracking than the Lubodrive RX at 0.75%.

Example 20–21

Example 20 demonstrates that the mineral oil, Bacchus 68, did not support the microbial growth, but killed the microbial in contrast to the commercially available beverage lube, Dicolube™ PL, manufactured by Diversey-Lever. Example 21 demonstrates that with the addition of the antimicrobial, methyl Paraben, to the mineral oil, the killing efficiency for the short time exposure was enhanced.

The Rate of Kill Antimicrobial Efficiency Test was carried out according to the method described below:

The bacteria, *staphylococcus aureus* ATCC6538 and enterobacter aerogenes ATCC 13048, were transferred and maintained on nutrient agar slants. Twenty-four hours prior to testing, 10 mls of nutrient broth was inoculated with a loopful of each organism, one tube each organism. The inoculated nutrient broth cultures were incubated at 37° C. Shortly before testing, equal volumes of both incubated cultures were mixed and used as the test inoculum.

For Dicolube PL, the lube was diluted to 0.5% wt with soft water. One ml of the inoculant was combined with 99 mls of the lubricant solution and swirled. For oil-based lube, equal volumes of organisms were centrifuged at 9000 rpm 20° C. for 10 minutes, then decanted and re-suspended in an equivalent volume of the mineral oil.

A one ml sample of the lubricant/inoculum mixture was removed after 5 minute exposure time and added to 9 mls of a sterile D/E neutralizing broth. The neutralized sample was serially diluted with buffered water and plated in duplicate using D/E neutralizing agar. The procedure was repeated after 15 and 60 minutes exposure times. The plates were incubated at 37° C. for 48 hours then examined.

Controls to determined initial inoculum were prepared by adding one ml of inoculum to 9% mls of buffered water, serially diluting the mixture with additional buffered water, and plating with TGE.

The % reduction and log reduction were calculated as:

% Reduction=[(# of initial inoculum−# of survivors)/(#of initial inoculum)]×100 where: # of initial inoculum=3.4×106 CFU/ml CFU/ml: Colony forming units/ml Log Reduction=[$\log_{10}$ (initial inoculum CFU/ml)]−[$\log_{10}$ (survivors inoculum CFU/ml)]

The table showed the results of Rate of Kill Test:

| LUBRICANT MATERIAL/TRADE-NAME | MATERIAL INFORMATION | VENDOR |
|---|---|---|
| Bacchus 22 | United States Pharmacopeia grade mineral oil | Vulcan Oil & Chemical Products |
| SF96-5 | Polydimethylsiloxane | GE silicones |
| Krytox GPL 100 | Perfluoropolyether | DuPont |
| Krytox GPL 200 | Perfluoropolyether mixed with FIFE (Polytetrafluoroethylene) | DuPont |
| Krytox DF 50 | Polytetrafluoroethylene in HCFC-14b | DuPont |
| Super lube oil with PTFE | Synthetic oil with PTFE | Synco Chemical |
| Oleic acid | Oleic acid | Henkel |
| Corn oil | Corn oil | |

| | EXAMPLE 20 Bacchus 68 | | | EXAMPLE 21 Bacchus 68 w 0.05% methyl Paraben* | | | COMPARISON EXAMPLE Dicolube PL | | |
|---|---|---|---|---|---|---|---|---|---|
| | | | | Test Concentration | | | | | |
| | 100% | | | 100% | | | 0.5% in DI water | | |
| | No. of survivors | Reduction | | No. of survivors | Reduction | | No. of survivors | Reduction | |
| Exposure time | CFU/ml | Log | Percent | CFU/ml | Log | Percent | CFU/ml | Log | Percent |
| 5 minutes | $2.4 \times 10^5$ | 1.15 | 92.941 | $8.6 \times 10^4$ | 1.60 | 97.470 | $3.5 \times 10^6$ | NR** | NR |
| 15 minutes | $2.3 \times 10^5$ | 1.17 | 93.235 | $4.3 \times 10^4$ | 1.90 | 98.735 | $3.6 \times 10^6$ | NR | NR |
| 60 minutes | $2.8 \times 10^5$ | 2.08 | 99.176 | $3.2 \times 10^4$ | 2.03 | 99.059 | $3.0 \times 10^6$ | 0.05 | 11.765 |

*Methyl Paraben: methyl 4-hydroxybenzoate, obtained 5 Chemicals Ltd.
**NR: No reduction Examples 22–23

These examples demonstrate that behenic acid, a dry solid lubricant, in combination with a liquid lubricant provides a mild steel-on-stainless steel and glass-on stainless steel lubricities which are better than or comparable to the second commercially available aqueous based lube.

| | EXAMPLE 22 Mild steel-on stainless steel lubricity | | EXAMPLE 23 Glass-on stainless steel lubricity | |
|---|---|---|---|---|
| | Behenic acid, then H₂O | Reference 2 | Behenic acid, then + H₂O | Reference 2 |
| Drag force (average) (g) | 26.0 | 28.0 | 25.0 | 28.0 |
| Rel COF | 0.929 | 1.000 | 0.893 | 1.000 |

A solution of 0.1% behenic acid in ethanol was applied to the stainless steel disc, a thin dry film was formed after the solvent evaporation. H₂O was then applied to the surface of the dry film coated disc for the lubricity measurement.

The following table describes materials used in the above examples.

Examples 24–28

These examples use an oil in an aqueous emulsion and a glycerine stress cracking inhibitor and an optional surfactant.

Example 24

| Raw Material | % Weight |
|---|---|
| Glycerine (99.5% active) | 72.7 |
| Alkyl Poly Glyceride | 2 |
| Dow Corning HV495 Silicone Emulsion | 2 |
| DI Water | 23.3 |

Example 25

| Raw Material | % Weight |
|---|---|
| Glycerine (96% active) | 75.7 |
| Alkyl Poly Glyceride | 2 |

-continued

| Raw Material | % Weight |
|---|---|
| Lambert E-2175 Silicone Emulsion | 2 |
| DI Water | 20.3 |

Example 26

| Raw Material | % Weight |
|---|---|
| Glycerine (96% active) | 77.24 |
| DI Water | 20.71 |
| Lambert E-2175 Silicone Emulsion | 2.05 |

Example 27

| Raw Material | % Weight |
|---|---|
| Glycerine (96% active) | 77.95 |
| DI Water | 20.1 |
| Mineral Seal Oil (White Oil) | 4.95 |

Example 28

| Raw Material | % Weight |
|---|---|
| Glycerin (96% active) | 77.24 |
| DI Water | 20.71 |
| Mineral Seal Oil (White Oil) | 2.05 |

The product of example 25 was tested for COF. FIG. 5 is a graphical representation of the friction data arising from the testing done with the Lubricant of Example 25. The results are as follows:

| Lube (Ex. 25) Applied g | COF unitless parameter | Lube Applied G | Lub per unit area g.sq In |
|---|---|---|---|
| 4 | 0.0846 | 4 | 0.002564 |
| 5 | 0.0717 | 5 | 0.003205 |
| 7 | 0.066 | 7 | 0.004487 |
| 10 | 0.0554 | 10 | 0.006410 |
| 15 | 0.0584 | 15 | 0.009615 |
| 20 | 0.0621 | 20 | 0.012821 |

Conveyor surface: 2 × 3.25" × 20 ft = 6.5" × 2012 = 1560 sq. In

Coefficient of friction (COF) measured on a short track conveyor system: The determination of lubricity of the lubricant was measured on a short track conveyor system. The conveyor was equipped with two belts from Rexnord. The belt was Rexnord LF (polyacetal) thermoplastic belt of 3.25" width and 20 ft long. The lubricant was applied to the conveyor surface evenly with a bottle wash brush. The conveyor system was run at a speed of 100 ft/min. Six 2 L bottles filled with beverage were stacked in a rack on the track with a total weight of 16.15 kg. The rack was connected to a strain gauge by a wire. As the belts moved, force was exerted on the strain gauge by the pulling action of the rack on the wire. A computer recorded the pull strength. The coefficient of friction (COF) was calculated on the basis of the measured force and the mass of the bottles and it was averaged from the beginning to the end of the run. The results of the testing of example 25 are shown in a graphical form in FIG. 5.

The lubricant compositions can if desired be evaluated using a Short Track Conveyor Test and a PET Stress Crack Test.

Short Track Conveyor Test

A conveyor system employing a motor-driven 83mm wide by 6.1 meter long REXNORD# LF polyacetal thermoplastic conveyor belt is operated at a belt speed of 30.48 meters/minute. Six 2-liter filled PET beverage bottles are stacked in an open-bottomed rack and allowed to rest on the moving belt. The total weight of the rack and bottles is 16.15 Kg. The rack is held in position on the belt by a wire affixed to a stationary strain gauge. The force exerted on the strain gauge during belt operation is recorded using a computer. A thin, even coat of the lubricant composition is applied to the surface of the belt using an applicator made from a conventional bottle wash brush. The belt is allowed to run for 15 minutes during which time a consistently low COF is observed. The COF is calculated on the basis of the measured force and the mass of the bottles, averaged over the run duration. Next, 60 ml of warm water is sprayed over a 30 second period onto the conveyor surface, just upstream from the rack (under the wire). Application of the lubricant is continued for another 5 minutes, and the average COF following the water spray and the resulting change in average COF are noted.

PET Stress Crack Test

Standard 2-liter PET beverage bottles (commercially available from Constar International) are charged with 1850 g of chilled water, 31.0 g of sodium bicarbonate and 31.0 g of citric acid. The charged bottle is capped, rinsed with deionized water and set on clean paper towels overnight. The bottoms of 6 bottles are dipped in a 200 g sample of the undiluted lube in a 125×65 mm crystal dish, then placed in a bin and stored in an environmental chamber at 37.8° C., 90% relative humidity for 14 days. The bottles are removed from the chamber, observed for crazes, creases and crack patterns on the bottom. The aged bottles are compared with 6 control bottles that were exposed to a comparison lubricant composition placed in the crystal dish, or exposed to a standard dilute aqueous lubricant (LUBODRIVE™ RX, commercially available from Ecolab) prepared as follows. A 1.7 wt. % solution of the LUBODRIVE lubricant (in water containing 43 ppm alkalinity as $CaCO_3$) was foamed for several minutes using a mixer. The foam was transferred to a lined bin and the control bottles were dipped in the foam. The bottles were then aged in the environmental chamber as outlined above.

Lubricity Test Procedure

Lubricity test was done by measuring the drag force (frictional force) of a weighted cylinder riding on a rotating disc, wetted by the testing sample. The material for the cylinder is chosen to coincide with the container materials, e.g., glass, PET, or aluminum. Similarly the material for the rotating disc is the same as the conveyor, e.g., stainless steel or plastics. The drag force, using an average value, is measured with a solid state transducer, which is connected, to the cylinder by a thin flexible string The weight of the cylinder made from the same material is consistent for all the measurements.

The relative coefficient of friction (Rel COF) was then calculated and used, where: Rel COF=COF(sample)/COF (reference)=drag force (sample)/drag force (reference).

Example 29

75 parts of a 96 wt. % glycerol solution, 20 parts deionized water, and 5 parts mineral seal oil (commercially available from Calument Lubricant Co.) were combined with stirring. The resulting lubricant composition was unstable and quickly separated into two phases upon standing. When re-agitated and applied to a surface, the lubricant composition formed a film that was slippery to the touch, and most of the lubricant readily could be rinsed from the surface using a plain water wash. Using the Short Track Conveyor Test, about 20 g of the lubricant composition was applied to the moving belt. The observed average COF was 0.066 before the water spray began, and 0.081 after the spray began, for a 0.015 increase in average COF due to the water spray.

In a comparison run, 74.3 parts of a 96 wt. % glycerol solution, 19.8 parts deionized water, 5 parts mineral seal oil (commercially available from Calument Lubricant Co.) and 0.99 parts SHEREX VEROINC™ T205 emulsifier (commercially available from Akzo Nobel Chemicals) were combined with stirring. The resulting lubricant composition was a stable emulsion that remained as a single-phase mixture upon standing. Using the Short Track Conveyor Test, about 20 g of the comparison lubricant composition was applied to the moving belt. The observed average COF was 0.073 before the water spray began, and 0.102 after the spray began, for a 0.029 increase in average COF due to the water spray. The COP for the comparison lubricant composition (which contained an emulsifier) increased almost twice as much in the presence of a water spray as the COF for the unstable lubricant composition of the invention. Thus the comparison lubricant composition was not as water-resistant as a lubricant composition of the invention.

The lubricant composition of this Example 29 and the comparison lubricant composition were also evaluated using the PET Stress Crack Test. The bottles exposed to the lubricant composition of the invention exhibited frequent small, shallow crazing marks and infrequent medium depth crazing marks. The bottles exposed to the comparison lubricant composition exhibited frequent medium depth crazing marks. Thus the bottoms of bottles lubricated with a lubricant composition of the invention had a better visual appearance after aging. No bottles leaked or burst for the lubricant composition of the invention. One of the bottles exposed to the comparison lubricant composition burst on day 9. This invention shows that a lubricant composition of the invention provided better burst and stress crack resistance than the comparison lubricant composition.

In a further comparison Short Track Conveyor test performed using a dilute aqueous solution of a standard conveyor lubricant (LUBODRIVE™ RX, commercially available from Ecolab, applied using a 0.5% dilution in water and about an 8 liter/hour spray application rate), the observed COF was 0.126, thus indicating that the lubricant composition of the invention provided reduced sliding friction compared to a standard dilute aqueous lubricant.

Example 30

Using the method of Example 29, 95 parts of a 96 wt. % glycerol solution and 5 parts mineral seal oil were combined with stirring. The resulting lubricant composition was unstable and quickly separated into two phases upon standing. When re-agitated and applied to a surface, the lubricant composition formed a that was slippery to the touch, and most of the lubricant readily could be rise from the surface using a plain water wash. Using the Short Track Conveyor Test, about 20 g of the lubricant composition was applied to the moving belt. The observed average COF was 0.061 before the water spray began, and 0.074 after the spray began, for a 0.013 change in average COF.

Example 31

Using the method of Example 29, 75 parts of a 96 wt. % glycerol solution, 20 parts deionized water and 5 parts mineral oil (ARIADNE™ 22, commercially available from Vulcan Oil and Chemical Products) were combined with stirring until a uniform mixture was obtained. The resulting lubricant composition was unstable and quickly separated into two phases upon standing. When re-agitated and applied to a surface, the lubricant composition formed a film that was slippery to the touch, and most of the lubricant readily could be rinsed from the surface using a plain water wash. Using the Short Track Conveyor Test, about 20 g of the lubricant composition was applied to the moving belt. The observed average COF was 0.072 before the water spray began, and 0.083 after the spray began, for a 0.011 change in average COF. The lubricant composition of this Example 31 was also evaluated using the PET Stress Crack Test. Following aging, the bottles exhibited frequent small, shallow crazing marks and infrequent medium depth crazing marks. None of the bottles leaked or burst.

Example 32

Using the method of Example 29, 77.24 parts of a 96 wt. % glycerol solution, 20.71 parts deionized water and 2.05 parts mineral seal oil were combined with stirring until a uniform mixture was obtained. The resulting lubricant composition was unstable and quickly separated into two phases upon standing. When re-agitated and applied to a surface, the lubricant composition formed a film that was slippery to the touch, and most of the lubricant readily could be rinsed from the surface using a plain water wash.

Example 33

77.2 parts of a 96 wt. % glycerol solution, 20.7 parts deionized water, and 2.1 parts E2175 high viscosity polydimethylsiloxane (60% siloxane emulsion commercially available from Lambent Technologies, Inc.) were combined with stirring until a uniform mixture was obtained. The resulting lubricant composition was slippery to the touch and readily could be rinsed from surfaces using a plain water wash. Using the Short Track Conveyor Test, about 20 g of the lubricant composition was applied to the moving belt over a 90 minute period. The observed COF was 0.062. In a comparison Short Track Conveyor test performed using a dilute aqueous solution of a standard conveyor lubricant (LUBODRIVE™ RX, commercially available from Ecolab, applied using a 0.5% dilution in water and about an 8 liter/hour spray application rate), the observed COF was 0.126, thus indicating that the lubricant composition of the invention provided reduced sliding friction.

The lubricant composition of Example 29 was also evaluated using the PET Stress Crack Test. The aged bottles exhibited infrequent small, shallow crazing marks. For the comparison dilute aqueous lubricant, frequent medium depth crazing marks and infrequent deeper crazing marks were observed. No bottles leaked or burst for either lubricant, but the bottoms of bottles lubricated with a lubricant composition of the invention had a better visual appearance after aging.

Example 34

Using the method of Example 29, 77.2 parts of a 96 wt. % glycerol solution, 20.7 parts deionized water, and 2.1 parts HV490 high molecular weight hydroxy-terminated dimethyl silicone (anionic 30–60% siloxane emulsion commercially available from Dow Corning Corporation) were combined with stirring until a uniform mixture was obtained. The resulting lubricant composition was slippery to the touch and readily could be rinsed from surfaces using a plain water wash. Using the Short Track Conveyor Test, about 20 g of the lubricant composition was applied to the moving belt over a 15 minute period. The observed COF was 0.058.

Example 35

Using the method of Example 29, 75.7 parts of a 96 wt. % glycerol solution, 20.3 parts deionized water, 2.0 parts HV490 high molecular weight hydroxy-terminated dimethyl silicone (anionic 30–60% siloxane emulsion commercially available from Dow Corning Corporation) and 2.0 parts GLUCOPON# 220 alkyl polyglycoside surfactant (commercially available from Henkel Corporation) were combined with stirring until a uniform mixture was obtained. The resulting lubricant composition was slippery to the touch and readily could be rinsed from surfaces using a plain water wash. Using the Short Track Conveyor Test, about 20 g of the lubricant composition was applied to the moving belt over a 15 minute period The observed COF was 0.071.

Example 36

Using the method of Example 29, 72.7 parts of a 99.5 wt. % glycerol solution, 23.3 parts deionized water, 2 parts HV495 silicone emulsion (commercially available from Dow Corning Corporation) and 2 parts GLUCOPON™ 220 alkyl polyglycoside surfactant (commercially available from Henkel Corporation) were combined with stirring until a uniform mixture was obtained. The resulting lubricant composition was slippery to the touch and readily could be rinsed from surfaces using a plain water wash. However, the presence of the surfactant caused an increase in stress cracking in the PET Stress Crack Test.

Two commercially available aqueous-based lubricants for beverage conveyors were used as reference at recommended use dosage. They are reference 1=LUBODRIVE RX and reference 2=Lubri-Klenz LF, both are manufactured by Ecolab.

A Rel COF lower than 1 indicates a better lubricant than the reference. A good lubricant would have a typical Rel COF of less than 1.2, while a value greater than 1.4 would indicate a poor lubricant. The lubricity results of some non-aqueous based lubricants were tested and are shown below. The lubricity measurement was carried out with the method described above. All the tests were using 100% of the stated materials or as indicated. The materials were either added or wiped onto the disc surface to result in a continuous film. The references were aqueous based lubricants and tested at 0.1% of conc. by weight in water for comparison. The test was run for several minutes until the force leveled off. The average drag force was recorded and the Rel COF was calculated based on the average drag forces of the testing sample and the reference.

Example 37–39

These examples demonstrated that corn oil, a natural oil, possesses lubricities which are better than or comparable to a commercially available aqueous based lube. The cylinder material was mild steel for Example 1, glass for Example 2, and PET for Example 3. The rotating disk was stainless steel for Example 1–3.

|  | EXAMPLE 37 Mild steel-on stainless steel lubricity | | EXAMPLE 38 Glass-on stainless steel lubricity | | EXAMPLE 39 PET-on stainless steel lubricity | |
|---|---|---|---|---|---|---|
|  | Corn oil | Refer. 1 | Corn oil | Refer. 1 | Corn oil | Refer. 1 |
| Drag force (average) (g) | 21.0 | 35.1 | 25.3 | 26.1 | 25.7 | 36.0 |
| Rel COF | 0.598 | 1.000 | 0.969 | 1.000 | 0.714 | 1.000 |

Example 40–42

These examples demonstrated that Bacchus 22, a mineral oil, possesses lubricities which are better than the commercially available aqueous based lube. The cylinder material was mild steel for Example 4, glass for Example 5, and PET for example 6. The rotating disk was stainless steel for Example 4–6.

|  | EXAMPLE 40 Mild steel-on stainless steel lubricity | | EXAMPLE 41 Glass-on stainless steel lubricity | | EXAMPLE 42 PET-on lubricity stainless steel lubricity | |
|---|---|---|---|---|---|---|
|  | Bacchus 22 | Refer. 1 | Bacchus 22 | Refer. 1 | Bacchus 22 | Refer. 1 |
| Drag force (average) (g) | 10.2 | 31.3 | 22.4 | 27.6 | 18.6 | 31.1 |
| Rel COF | 0.326 | 1.000 | 0.812 | 1.000 | 0.598 | 1.000 |

Example 43–44

These examples demonstrated that the two synthetic lubricants have a mild steel-on-stainless steel lubricity that is better than or comparable to the commercially available aqueous based lube. The cylinder material was mild steel and the rotating disk was stainless steel.

|  | EXAMPLE 43 Krytox GPL 100 | EXAMPLE 44 Krytox GPL 200 | Reference 1 |
|---|---|---|---|
| Drag force (average) (g) | 15.1 | 34.3 | 35.0 |
| Rel COF | 0.431 | 0.980 | 1.000 |

Example 45

This example demonstrated that SF96-5, a synthetic siloxane lubricant, has a PET-on stainless steel lubricity that is better than the commercially available aqueous based lube. The cylinder material was PET and the rotating disk was stainless steel.

|  | SF96-5 | Reference 1 |
| --- | --- | --- |
| Drag force (average) (g) | 27.6 | 35.1 |
| Rel COF | 0.786 | 1.000 |

Example 46

This example demonstrated that Krytox DF50, a solid lubricant in a solvent, possesses a mild steel-on stainless steel-lubricity that is comparable to the commercially available aqueous based lube. The cylinder material was mild steel and the rotating disk was stainless steel.

|  | Krytox DF50 | Reference 1 |
| --- | --- | --- |
| Drag force (average) (g) | 5.7 | 35.0 |
| Rel COF | 1.020 | 1.000 |

The sample was applied to the disc surface then the coating was wiped with an isopropanol-wetted towel and air dried to result in a very thin smooth coating.

Example 47–48

These examples demonstrated that behenic acid, a dry solid lubricant possesses a mild steel-on-stainless steel and glass-on-stainless steel lubricities which are comparable to a second commercially available aqueous based lube.

|  | EXAMPLE 47 Mild steel-on stainless steel lubricity | | EXAMPLE 48 Glass-on stainless steel lubricity | |
| --- | --- | --- | --- | --- |
|  | Behenic acid | Reference 2 | Behenic acid | Reference 2 |
| Drag force (average) (g) | 30.0 | 28.0 | 28.0 | 28.0 |
| Rel COF | 1.071 | 1.000 | 1.000 | 1.000 |

A solution of 0.1% % behenic acid in ethanol was applied to the stainless steel rotating disc. A thin dry film was formed after the solvent evaporation.

Example 49

This example demonstrated that the Super lube oil with PTFE possesses a mild steel-on-stainless steel lubricity that is better than the commercially available aqueous based lube. The rotating disk was stainless steel.

|  | Super lube oil with PTFE | Reference 1 |
| --- | --- | --- |
| Drag force (average) (g) | 27.9 | 33.2 |
| Rel COF | 0.840 | 1.000 |

Example 50–51

These examples demonstrated that the mixture of oleic acid and Krytox GPL 100 possesses mild steel-or-stainless steel and PET-on-stainless steel lubricities, which are better than the commercially available aqueous based lube. The ratio of oleic acid to Krytox GPL 100 is about 1:1 by weight. The rotating disk was stainless steel.

|  | EXAMPLE 50 Mild steel-on stainless steel lubricity | | EXAMPLE 51 PET-on stainless steel lubricity | |
| --- | --- | --- | --- | --- |
|  | Oleic acid/ Krytox GPL100 (1:1) | Reference 1 | Oleic acid/ Krytox GPL100 (1:1) | Reference 1 |
| Drag force (average) (g) | 17.1 | 33.7 | 21.4 | 35.7 |
| Rel COF | 0.507 | 1.000 | 0.5999 | 1.000 |

Example 52–53

These examples demonstrate that the mineral oil, Bacchus 68 and its mixture with an antimicrobial agent, Irgasan DP300 (2,4,4'-trichloro--2'-hydroxy-diphenyl-ether, obtained from Ciba Specialty Chemicals) possess a superior PET stress cracking resistance.

PET Bottle Stress Cracking Test:

31.0 g of sodium bicarbonate and 31.0 g of citric acid were added to a 2-liter PET bottle (manufactured by Plastipak) containing 1850 g of chilled water and the bottle was capped immediately. The charged bottle was then rinsed with DI water and set on clear paper towel overnight.

Two testing liquids were prepared. Bacchus 68 was used as such as supplied. Bacchus 68+0.2% Irgasan DP300 was made by dissolving 1.0 g of Irgasan DP300 in 500 g of Bacchus 68 to result in a clear solution.

The base of the charged bottle was dipped into the testing liquid for 2–3 seconds then the bottle was placed in a plastic bag. The bottle with the bag was set in a bin and aged at 37.8° C. and 90% humidity for 15 days. Four bottles were used for each testing liquid. The bottle was examined several times during the aging for After the aging, the base of the bottle was cut off and examined for crazing and cracking. The results are listed in the table below.

The grading is based on a scale of A–F as:

A: No signs of crazing to infrequent small, shallow crazes.
B: Frequent small, shallow to infrequent medium depth crazes which can be felt with a fingernail.
C: Frequent medium depth to infrequent deep crazes.
D: Frequent deep crazes.
F: Cracks, bottle burst before end of the 15 day testing.

| PET STRESS CRACKING GRADING | | |
| --- | --- | --- |
| Testing Liquid | EXAMPLE 52 Bacchus 68 | EXAMPLE 53 Bacchus 68 + 0.2% Irgasan DP300 |
| Bottle 1 | B | B |
| Bottle 2 | B | B |
| Bottle 3 | B | B |
| Bottle 4 | B | B |

Example 54

This example demonstrates that the mineral oil, Bacchus 68 possesses a higher PET stress cracking resistance in contrast to the aqueous based beverage conveyor lubricant, Lubodrive RX at a possible use dosage for conveyor lubrication.

The experimental procedure was the same as described in example 52–53 except that the testing liquid for Lubrodrive RX was 0.75% by weight in DI water. The charged bottle was placed in the plastic bag that contained 100 g of the diluted Lubodrive RX. Also the experimental was carried out in the environmental oven at 37.8° C. and 90% humidity for 13 days instead of 15 days.

The results showed that Bacchus 68 caused less s cracking than the Lubodrive RX at 0.75%.

Example 55–56

Example 55 demonstrates that the mineral oil Bacchus 68, did not support the microbial growth, but killed the micro- The % reduction and log reduction were calculated as:

% Reduction=[(# of initial inoculum−# of survivors)/(#of initial inoculum)]×100 where: # of initial inoculum=$3.4 \times 10^6$ CFU/ml CFU/ml: Colony forming units/ml Log Reduction=[$\log_{10}$ (initial inoculum CFU/ml)]−[log10 (survivors inoculum CFU/ml)]

The table showed the results of Rate of Kill Test:

|  | EXAMPLE 55 Bacchus 68 | | | EXAMPLE 56 Bacchus 68 w 0.05% methyl Paraben* | | | COMPARISON EXAMPLE Dicolube PL | | |
|---|---|---|---|---|---|---|---|---|---|
|  | Test Conc. | | | | | | | | |
|  | 100% | | | 100% | | | 0.5% in DI water | | |
| Exposure time | No. of survivors CFU/ml | Reduction Log | % | No. of survivors CFU/ml | Reduction Log | % | No. of survivors CFU/ml | Reduction Log | % |
| 5 min. | $2.4 \times 10^5$ | 1.15 | 92.041 | $8.6 \times 10^4$ | 1.60 | 97.470 | $3.5 \times 10^6$ | NR** | NR |
| 15 min. | $2.3 \times 10^5$ | 1.17 | 93.235 | $4.3 \times 10^4$ | 1.90 | 98.735 | $3.6 \times 10^6$ | NR | NR |
| 60 min. | $2.8 \times 10^5$ | 2.08 | 99.176 | $3.2 \times 10^4$ | 2.03 | 99.059 | $3.0 \times 10^6$ | 0.05 | 11.765 |

*Methyl Paraben: methyl 4-hydroxybenzoate, obtained from AVOCADO Research Chemicals Ltd.
**NR: No reduction bial in contrast to the commercially available beverage lube, Dicolube PL, manufactured by Diversey-Lever. Example 56 demonstrates that with the addition of the antimicrobial, methyl Paraben, to the mineral oil, the killing efficiency for the short time exposure was enhanced.

The Rate of Kill Antimicrobial Efficiency Test was carried out according to the method described below:

The bacteria, staphylococcus aureus ATCC6538 and enterobacter aerogenes ATCC 13048, were transferred and maintained on nutrient agar slants. Twenty-four hours prior to testing, 10 mls of nutrient broth was inoculated with a loopful of each organism, one tube each organism. The inoculated nutrient broth cultures were incubated at 37° C. Shortly before testing, equal volumes of both incubated cultures were mixed and used as the test inoculum.

For Dicolube PL, the lube was diluted to 0.5% wt with soft water. One ml of the inoculant was combined with 99 mls of the lubricant solution and swirled. For oil-based lube, equal volumes of organisms were centrifuged at 9000 rpm 20° C. for minutes, then decanted and re-suspended in an equivalent volume of the mineral oil.

A one ml sample of the lubricant/inoculum mixture was removed after 5 minute exposure time and added to 9 mls of a sterile D/E neutralizing broth. The neutralized sample was serially diluted with buffered water and plated in duplicate using D/E neutralizing agar. The procedure was repeated after 15 and 60 minutes exposure times. The plates were incubated at 37° C. for 48 hours then examined.

Controls to determined initial inoculum were prepared by adding one ml of inoculum to 9% mls of buffered water, serially diluting the mixture with additional buffered water, and plating with TGE.

Examples 57–58

These examples demonstrate that behenic acid, a dry solid lubricant, in combination with a liquid lubricant provides a mild steel-on-stainless steel and glass-on-stainless steel lubricities which are better than or comparable to the second commercially available aqueous based lube.

|  | EXAMPLE 57 Mild steel-on stainless steel lubricity | | EXAMPLE 58 Glass-on-stainless steel lubricity | |
|---|---|---|---|---|
|  | Behenic acid, then H$_2$O | Reference 2 | Behenic acid, then + H$_2$O | Reference 2 |
| Drag force (average) (g) | 26.0 | 28.0 | 25.0 | 28.0 |
| Rel COF | 0.929 | 1.000 | 0.893 | 1.000 |

A solution of 0.1% % behenic acid in ethanol was applied to the stainless steel disc, a thin dry film was formed after the solvent evaporation. H$_2$O was then applied to the surface of the dry film coated disc for the lubricity measurement.

The following table describes materials used in the above examples.

| LUBRICANT MATERIAL/ TRADE NAME | MATERIAL INFORMATION | VENDOR |
|---|---|---|
| Bacchus 22 | United States Pharmacopeia grade mineral oil | Vulcan Oil & Chemical Products |
| SF96-5 | Polydimethylsiloxane | GE silicones |

-continued

| LUBRICANT MATERIAL/ TRADE NAME | MATERIAL INFORMATION | VENDOR |
|---|---|---|
| Krytox GPL 100 | Perfluoropolyether | DuPont |
| Krytox GPL 200 | Perfluoropolyether mixed with PTFE (Polytetrafluoroethylene) | DuPont |
| Krytox DF50 | Polytetrafluoroethylene in HCFC-14b | DuPont |
| Super lube oil with PTFE | Synthetic oil with PTFE | Synco Chemical |
| Oleic acid | Oleic acid | Henkel |
| Corn oil | Corn oil | |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of inhibiting stress cracking in a thermoplastic shaped article, the method comprising lubricating the interface between the conveyor and the shaped article with a liquid hydrocarbon oil forming a lubricated article.

2. The method of claim 1 wherein the lubricated article is filled with a liquid.

3. The method of claim 1 wherein the hydrocarbon oil comprises a hydrocarbon oil having a viscosity of less than about 50 cSt at 40° C.

4. The method of claim 1 wherein the liquid lubricating oil additionally comprises an additive.

5. The method of claim 1 wherein the thermoplastic comprises a polyester.

6. The method of claim 1 wherein the polyethylene terephthalate container comprises a carbonated beverage container.

7. The method of claim 1 wherein the container comprises a base with at least three lobes and is free of a base cup.

8. A method of lubricating the interface between a container and a moving conveyor surface, in the substantial absence of foamed lubricant and lubricant runoff, the method comprising:
   (a) forming a continuous thin film of a liquid lubricant composition on a container contact surface of a conveyor; and
   (b) moving a container on the conveyor surface in order to transport the container from a first location to a second location.

9. The method of claim 8 wherein the liquid lubricant comprises an emulsion of an organic phase and an aqueous phase.

10. The method of claim 9 wherein the emulsion contains about 5 to 50 wt % of the aqueous phase.

11. The method of claim 8 wherein the lubricant comprises a suspension of a particulate in a liquid medium.

12. The method of claim 8 wherein the container comprises an aluminum can or a thermoplastic bottle.

13. The method of claim 8 wherein the liquid lubricant is applied to the surface of the conveyor in an amount of about $2 \times 10^{-4}$ to 0.05 grams of lubricant per each square inch of surface.

14. The method of claim 8 wherein the thickness of the continuous thin film of lubricant comprises a minimum thickness of an amount sufficient to provide minimum lubricating properties up to about 5 millimeters.

15. The method of claim 12 wherein thermoplastic bottle comprises a polyethylene terephthalate bottle having a pentaloid base and the area of contact of the lubricant with the bottle is limited to the tips of the pentaloid structure.

16. The method of claim 8 wherein the method is free of any substantial stress placed on the container for the purpose of changing the shape of the container.

17. The method of claim 9 wherein the emulsion is a composition stable to phase separation.

18. The method of claim 9 wherein the emulsion is unstable to phase separation after application of the lubricant to the conveyor surface.

19. The method of claim 8 wherein the coefficient of friction between the container and the conveyor surface is about 0.005 to 0.14.

20. The method of claim 8 wherein the lubricant is applied to the conveyor surface using a spray applicator.

21. The method of claim 8 wherein the container is filled with carbonated beverage and the interior of the container is maintained under substantial pressure.

22. The method of claim 8 wherein the continuous thin film of the lubricant is placed on the surface of the moving conveyor leaving an unlubricated margin on the conveyor edge.

23. The method of claim 22 wherein the width of the lubricated area on the conveyor is about 3 to 150 inches.

24. The method of claim 23 wherein the unlubricated margins comprise greater than about 0.5 inches.

25. The method of claim 8 wherein the conveyor receives about 50 to about 4000 contain per minute.

26. The method of claim 15 wherein contact with the polyester container is limited to no more than 2 millimeters of height from the conveyor surface in contact with the pentaloid lobes in the substantial absence of contact between the lubricant and the body of the container above the lobe area.

27. The method of claim 8 wherein the lubricant composition is formed into a thin film undiluted or up to a 5:1 dilution of the water with the lubricant.

28. The method of claim 8 wherein the lubricant composition is formed into a thin film in the absence of an inline dilution of the lubricant.

29. The method of claim 8 wherein the first location is a filling station and the second location is a labeling station.

30. The method of claim 15 wherein the area of the bottle in contact with the lubricant comprises about 10 to 250 mm$^2$.

31. The method of claim 8 wherein the thickness of the continuous thin film of lubricant comprises a minimum thickness of an amount sufficient to provide minimum lubricating properties about 0.0001 to 2 millimeters.

32. The process according to claim 8, additionally comprising cleaning said conveyor with a cleaning solution to remove the lubricant.

33. The process of claim 8 wherein the amounts of lubricant run off comprises less than about 1 gram per minute per lineal foot of conveyor.

* * * * *